(12) United States Patent
Nishimura et al.

(10) Patent No.: US 7,720,493 B2
(45) Date of Patent: May 18, 2010

(54) COMMUNICATION SYSTEM, MULTICAST SWITCHING DEVICE, AND COMMUNICATION METHOD

(75) Inventors: Kenji Nishimura, Yokosuka (JP); Hiroshi Kawakami, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1723 days.

(21) Appl. No.: 10/762,534

(22) Filed: Jan. 23, 2004

(65) Prior Publication Data
US 2004/0151157 A1 Aug. 5, 2004

(30) Foreign Application Priority Data
Jan. 24, 2003 (JP) .............................. 2003-016517

(51) Int. Cl.
H04W 4/00 (2009.01)
H04B 7/00 (2006.01)
G08C 13/00 (2006.01)
H04J 3/00 (2006.01)

(52) U.S. Cl. ..................... 455/466; 455/507; 455/509; 370/235; 370/236; 370/345

(58) Field of Classification Search ................. 370/347, 370/342, 312, 329, 235, 236, 345; 455/450–452.1, 455/466, 503, 507, 509; 709/201, 202
See application file for complete search history.

(56) References Cited

U.S. PATENT DOCUMENTS 5,930,248 A * 7/1999 Langlet et al. .............. 370/347

| | | | |
|---|---|---|---|
| 5,950,135 A | 9/1999 | Cullen | |
| 6,392,995 B1 | 5/2002 | Quinquis et al. | |
| 2003/0156540 A1* | 8/2003 | Trossen et al. ............ 370/232 | |

FOREIGN PATENT DOCUMENTS

| EP | 0 896 442 | 2/1999 |
|---|---|---|
| EP | 1 128 704 | 8/2001 |
| JP | 10-75205 | 3/1998 |
| JP | 2001-186559 | 7/2001 |

OTHER PUBLICATIONS

3G TR 25.832 v3.0.0, pp. 1-13, "3$^{RD}$ Generation Partnership Project; Technical Specification Group Radio Access Network; Manifestations of Handover and SRNS Relocation", Oct. 1999.

* cited by examiner

Primary Examiner—George Eng
Assistant Examiner—Nam Huynh
(74) Attorney, Agent, or Firm—Oblon, Spivak, McClelland, Maier & Neustadt, L.L.P.

(57) ABSTRACT

A communication system includes an MP high-order switching device which determines, for each of a plurality of switching devices, transmission timing at the which the switching device transmits packet data to a plurality of devices connected to the switching device so that data reception timings at a mobile terminal become simultaneous among the plurality of base stations, and a communication section which, in each of the plurality of switching devices, transmits packet data to the plurality of devices connected to the switching device, based on the determined transmission timing corresponding to the switching device.

10 Claims, 16 Drawing Sheets

COMMUNICATION SYSTEM, MULTICAST SWITCHING DEVICE, AND COMMUNICATION METHOD

CROSS REFERENCE TO RELATED APPLICATIONS

This application is based upon and claims the benefit of priority from the prior Japanese Patent Applications No. P2003-16517, filed on Jan. 24, 2003; the entire contents of which are incorporated herein by reference.

BACKGROUND OF THE INVENTION

1. Field of the Invention

The present invention relates to a communication system in which a soft handover process and a multicast communication process are carried out in communication between a mobile terminal and a communication terminal device, a multicast switching device, and a communication method.

2. Description of the Related Art

Conventionally, there has been available a universal mobile telecommunication system (UMTS) as a mobile communication system standardized by 3rd generation partner project (3GPP). In this UMTS, a W-CDMA system is used as a multiplexing system of a radio communication path. In the UMTS, a soft handover system (diversity handover system) is used as a handover system of a mobile terminal. In the soft handover system, a subscriber line extension system is used. In the UMTS, for example, when data communication is carried out between a communication terminal device and the mobile terminal, a device which carries out multicast communication (device present in a communication path between the mobile terminal and the communication terminal device, referred to as a multipath point device hereinafter) is not changed while a soft handover process is being executed by the mobile terminal. That is, in the UMTS, even if the mobile terminal moves and switches base stations to communicate with in radio communication, the following processing is carried out. That is, data sent from the communication terminal device is always transmitted to the mobile terminal through the multipath point device.

The UMTS includes a core network section (CN section) and a radio access network section (RAN section). In the UMTS, it is a radio network controller (hereinafter, referred to as RNC), arranged in the RAN section, that becomes the multipath point device. When the UMTS is used to carry out data communication between one mobile terminal and one communication terminal device, the number of multipath point devices is one (see 3GTR 25.832 "Manifestations of Handover and SRNC Relocation").

An example of processing carried out by a communication system using such a UMTS is as follows. FIGS. 1 and 2 are views for explaining the processing carried out by the communication system. The communication system includes a communication terminal device 210, a mobile subscriber switching device (MSC or SGSN) 220 connected to the communication terminal device 210 through a public network (not shown), a plurality of RNCs 231, 232 connected to the mobile subscriber switching device 220, a plurality of base stations 241, 242, ... connected to the RNCs (in star connection), and a mobile terminal 250 which carries out radio communication with the plurality of base stations.

In the communication system shown in FIGS. 1 and 2, a soft handover process is carried out by the mobile terminal 250, and the mobile terminal 250 is in a state of being capable of executing radio communication with the plurality of base stations 242, 243. Here, a network including the mobile subscriber switching device 220 corresponds to the CN section. Note that the CN section may include a mobile gateway switching device (not shown), which is arranged between the mobile subscriber switching device 220 and the communication terminal device 210 in the communication system. A network including the RNCs 231, 232, and the base stations 241, 242, corresponds to the RAN section.

Each of the RNCs 231, 232, carries out a control process for radio resources and a control process necessary when the mobile terminal 250 moves and executes a handover process. The mobile terminal 250 carries out a well-known maximum ratio combining process based on data sent from a plurality of base stations. Thus, the mobile terminal 250 obtains data of high communication quality.

Operation of this communication system is as follows. First, when the mobile terminal 250 starts data communication with the communication terminal device 210, the RNC 231 is determined as a multipath point device. In the data communication between the mobile terminal 250 and the communication terminal device 210, the RNC 231 is always a multipath point device (anchor multipath point device). Hereinafter, this device (RNC 231) will be referred to as a serving RNC (SRNC). As shown in FIG. 1, when the mobile terminal adds or switches over to another radio communication opponent, which is a base station connected to the SRNC 231, (the case will be referred to as Intra-RNC handover hereinafter), the SRNC 231 transmits data sent from the communication terminal device 210 to the plurality of base stations 242, 243 (base stations to execute radio communication with the mobile terminal 250) in a multicast manner. Data is then transmitted from each of the base stations 242, 243 to the mobile terminal 250 (communication paths A-1, A-2).

On the other hand, when the mobile terminal 250 moves and therefore executes radio communication with the base stations 242, 243 connected to the SRNC 231, and at the same time, executes new radio communication with the base station 244 connected to the RNC 232 different from the SRNC 231 (referred to as Inter-RNC handover), the following processing is carried out. That is, as shown in FIG. 2, when data is sent from the communication terminal device 210 to the mobile terminal 250 through the plurality of base stations 242, 243, 244, the data sent from the communication terminal device 210 is transmitted to the SRNC 231 through the mobile subscriber switching device 220. The SRNC 231 then transmits the data to the plurality of base stations 242, 243 in a multicast manner. Subsequently, the data is sent from each of the base stations 242, 243 to the mobile terminal 250 (communication paths B-1, B-2).

On the other hand, when data is sent from the communication terminal device 210 to the mobile terminal 250 through the base station 244, it is only the SRNC 231 that can execute multicast transmission. Accordingly, the data sent from the communication terminal device 210 is once transmitted to the SRNC 231 through the mobile subscriber switching device 220 (communication path B-31). The SRNC 231 then transmits the data to the RNC 232 (communication path B-32). The RNC 232 transmits the data to the base station 244 (communication path B-33). The base station 244 transmits the data to the mobile terminal 250.

Additionally, when data is transmitted from the mobile terminal 250 to the communication terminal device 210, the following processing is carried out. In the case of Intra-RNC handover, the SRNC 231 transmits data sent from the plurality of base stations 242, 243 to the mobile subscriber switching device 220. The mobile subscriber switching device 220 transmits the data to the communication terminal device 210.

In the case of Inter-RNC handover, the following processing is carried out. That is, when the mobile terminal 250 sends data to the communication terminal device 210 through a base station, first, the data sent from the mobile terminal 250 is transmitted to the plurality of base stations 242, 243. The SRNC 231 obtains the data transmitted from the plurality of base stations 242, 243, and sends the data to the mobile subscriber switching device 220. The mobile subscriber switching device 220 transmits the data to the communication terminal device 210.

On the other hand, when the mobile terminal 250 sends data to the communication terminal device 210 through the base station 244, the data sent from the mobile terminal 250 is transmitted to the base station 244. The base station 244 transmits the data to the RNC 232. The RNC 232 transmits the data to the SRNC 231 through the mobile subscriber switching device 220. The SRNC 231 transmits the data to the mobile subscriber switching device 220. The mobile subscriber switching device 220 transmits the data to the communication terminal device 210.

In such an event, it is the SRNC 231 that executes various control processes concerning the data communication between the communication terminal device 210 and the mobile terminal 250. The RNC 232 carries out only a data relaying process (see 3G TR 25.832 "Manifestations of Handover and SRNC Relocation").

However, the following problems have been inherent in the foregoing prior art. In the case of the Inter-RNC handover described above, when the data is sent from the communication terminal device 210 to the mobile terminal 250 through the base station 244, the data is transmitted to the mobile terminal 250 through the mobile subscriber switching device 220, the SRNC 231, the RNC 232, and the base station 244.

Here, the data is transmitted from the mobile subscriber switching device 220 to the RNC 232 through the SRNC 231. Consequently, in the foregoing prior art, compared with a case in which data is directly transmitted from the mobile subscriber switching device 220 to the RNC 232, the path of the data communication from the communication terminal device 210 to the mobile terminal 250 includes a redundant path.

Similarly, in the case of the Inter-RNC handover, when the data is sent from the mobile terminal 250 to the communication terminal device 210 through the base station 244, the data is transmitted to the communication terminal device 210 through the base station 244, the RNC 232, the SRNC 231 and the mobile subscriber switching device 220.

Here, the data is not transmitted directly from the RNC 232 to the communication terminal device 210 through the mobile subscriber switching device 220. Consequently, in the foregoing prior art, compared with a case in which data is directly transmitted from the RNC 232 to the communication terminal device 210 through the mobile subscriber switching device 220, the path of the data communication from the mobile terminal 250 to the communication terminal device 210 includes a redundant path.

The presence of such redundant paths has caused a problem of wasteful consumption of network resources in the data communication between the communication terminal device 210 and the mobile terminal 250.

In order to solve this problem, the following processing need be carried out in the communication system. That is, not only the SRNC 231 but also the mobile subscriber switching device 220 need be capable of transmitting data sent from the communication terminal device 210 to a plurality of devices in a multicast manner, or the mobile subscriber-switching device 220 need be capable of transmitting the data sent from a plurality of devices (including devices other than the SRNC) directly to the communication terminal device 210.

Therefore, in the case of radio communication executed by the mobile terminal 250 with the plurality of base stations (in soft handover state), it is possible to prevent wasteful consumption of network resources if each of switching devices can carry out processes (e.g. multicast communication process) of the multipath point device during the data communication between the mobile terminal 250 and the communication terminal device 210.

Furthermore, data sent from the communication terminal device 210 to the mobile terminal 250 is transmitted to the plurality of base stations 242, 243, 244. In order to realize soft handover, the data sent from each of the base stations 242, 243, 244 need be received by the mobile terminal 250 at the same timing. Additionally, when the data sent from the mobile terminal 250 is transmitted to the communication terminal device 210, communication quality of the data obtained by the communication terminal device 210 need be made good.

BRIEF SUMMARY OF THE INVENTION

An objects of the present invention is to provide a communication system, a multicast switching device and a communication method, which can prevent wasteful consumption of network resources and set timings at which a mobile terminal receives data from base stations to become simultaneous among the base stations when the mobile terminal executes radio communication with a plurality of base stations in data communication between the mobile terminal and a communication terminal device, or to provide a communication system, a multicast switching device and a communication method, which can prevent wasteful consumption of network resources and improve communication quality of data obtained by the communication terminal device to be favorable.

The present invention is characterized in that, a communication system in which, when a communication terminal device transmits data to a mobile terminal through a plurality of base stations, each of a plurality of switching devices included in communication paths between the communication terminal device and the plurality of base stations transmits packet data in a multicast manner to a plurality of devices connected to the switching device, comprising: a first determiner which, based on a time period necessary for transmission of the packet data from each of one or more of the plurality of switching devices to one or more base stations connected to the switching device and based on a time period necessary for transmission of the packet data from each of one or more of the plurality of switching devices to one or more switching devices connected to the switching device at mobile terminal side, determines, for each of the switching devices, transmission timing indicating timing at which the switching device transmits the packet data to the plurality of devices connected to the switching device so that data reception timings at the mobile terminal become simultaneous among the plurality of base stations; and a first transmitter which, in each of the switching devices, transmits the packet data to the plurality of devices connected to the switching device, based on the transmission timing determined by the first determiner.

DETAILED DESCRIPTION OF THE INVENTION

Figure 1:
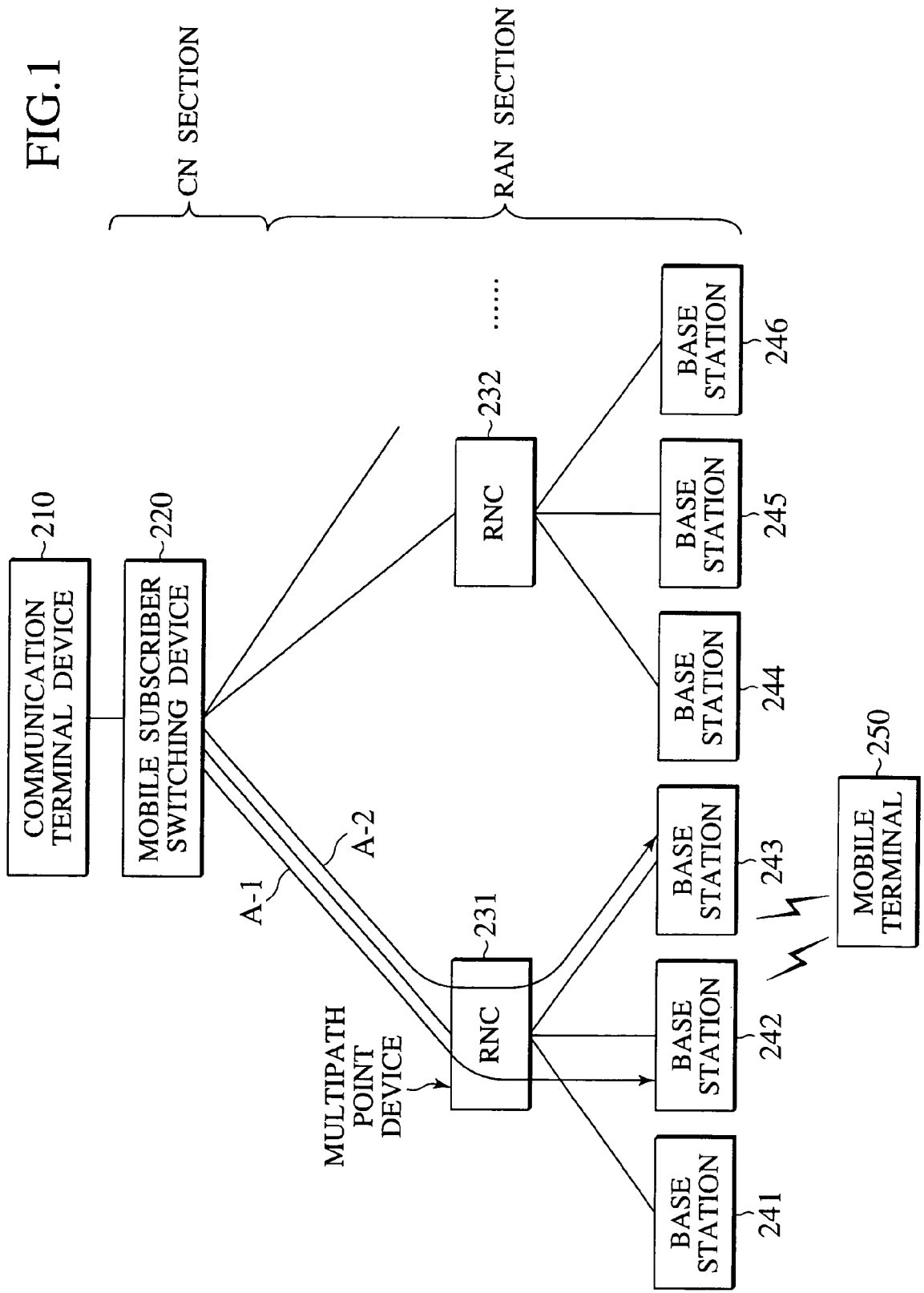
FIG. 1 is a view showing a configuration of a communication system to explain a conventional art.
Figure 2:
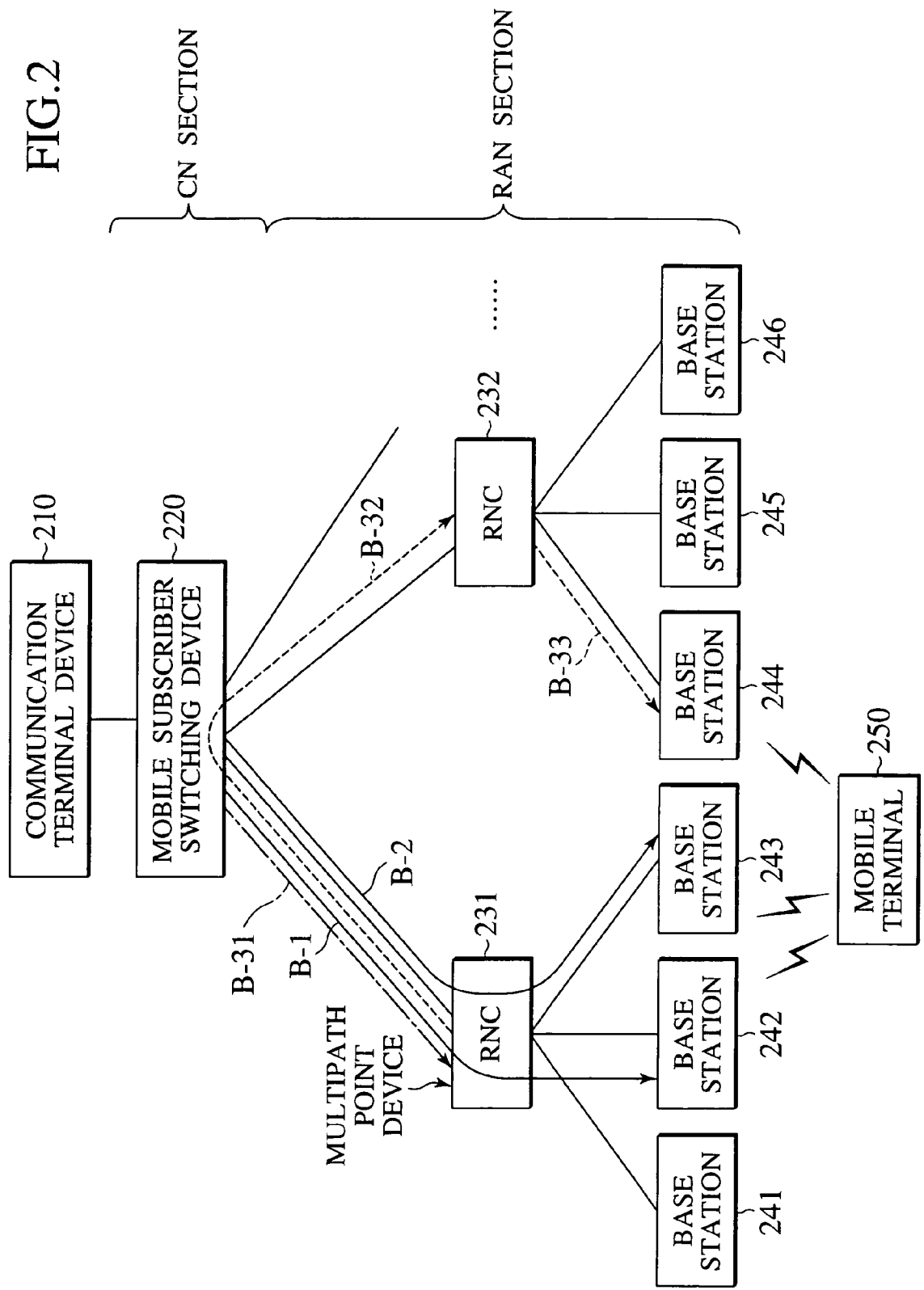
FIG. 2 is a view showing the configuration of the communication system to explain the conventional art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure.

In the following descriptions, numerous specific details are set fourth such as specific signal values, etc. to provide a thorough understanding of the present invention. However, it will be obvious to those skilled in the art that the present invention may be practiced without such specific details. In other instances, well-conventional circuits have been shown in block diagram form in order not to obscure the present invention in unnecessary detail.

Embodiments (Configuration of Communication System)

Figure 3:
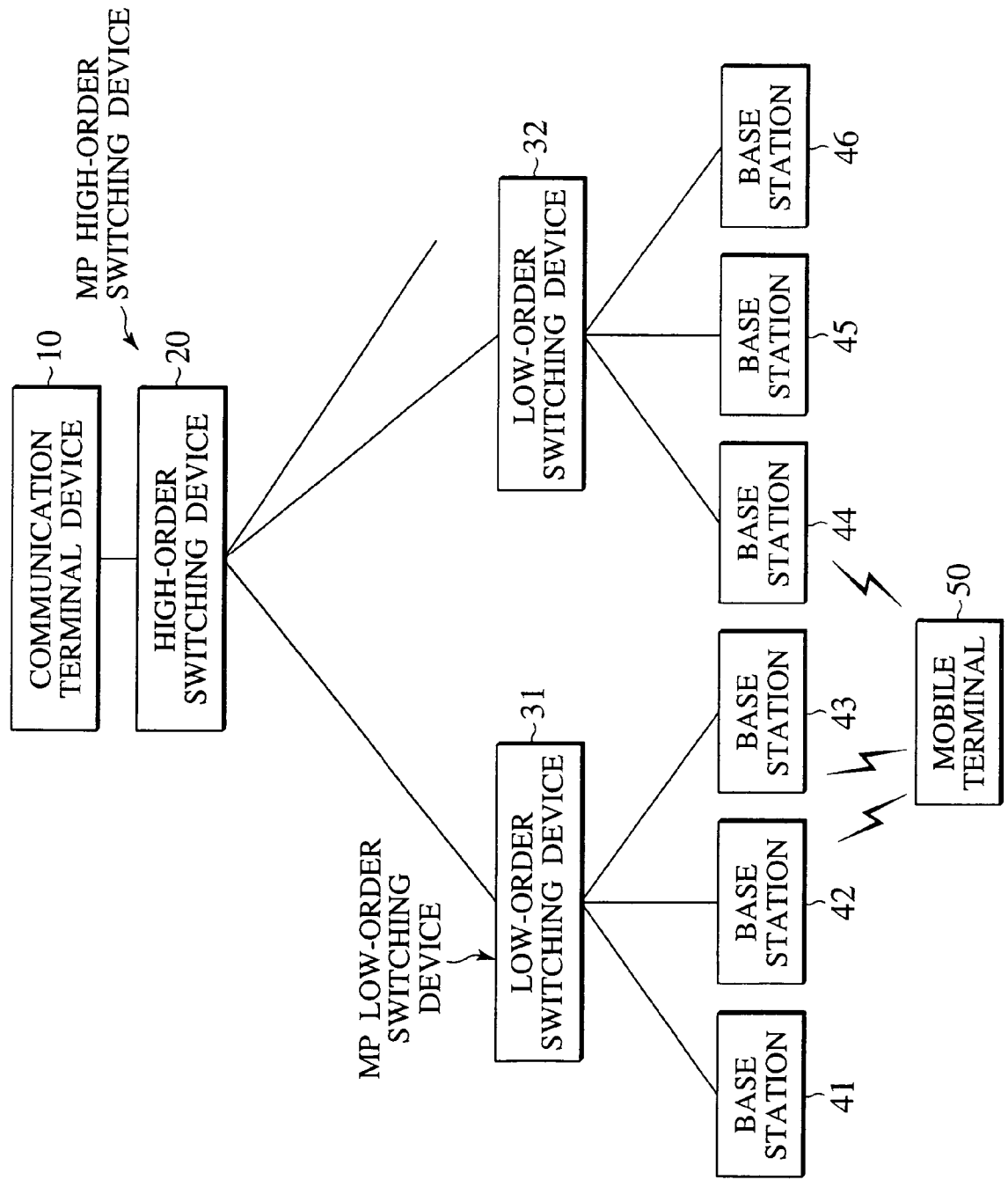
FIG. 3 is a view showing a configuration of a communication system of an embodiment.

FIG. 3 is a view showing a configuration of a communication system of an embodiment. The communication system includes a communication terminal device 10, a switching device (referred to as a high-order switching device hereinafter) connected to the communication terminal device 10 through a public network (not shown), a plurality of switching devices (referred to as low-order switching devices 31, 32, . . . hereinafter) connected to the high-order switching device 20, a plurality of base stations 42, 42, . . . connected to the low-order switching devices 31, 32, . . . , and a mobile terminal 50. In the communication system of the embodiment, when the communication terminal device 10 transmits data to the mobile terminal 50 through the plurality of base stations 41, 42, the plurality of switching devices (e.g., high-order switching device 20, low-order switching device 31) included in communication paths between the communication terminal device 10 and the plurality of base stations 41, 42, . . . transmit packet data to the plurality of devices (e.g., low-order switching device 31, base stations 42, 43 and 44) connected to the switching devices in a multicast manner.

Incidentally, according to the present invention, the plurality of low-order switching devices may be a plurality of first low-order switching devices and a plurality of second low-order switching devices. In this case, in the communication system, the plurality of first low-order switching devices are connected to each high-order switching device 20, the plurality of second low-order switching devices are connected to each first low-order switching device, and a plurality of base stations are connected to each N-th low-order switching device (N is an integer). The embodiment will be described by way of example in which one low-order switching device is included in communication paths between the high-order switching device 20 and each base station.

The following processing is carried out at the time of starting communication between the mobile terminal 50 and the communication terminal device 10. The mobile terminal 50 transmits communication information indicating execution of radio communication with a predetermined base station to the predetermined base station. For example, it is assumed that the mobile terminal 50 transmits communication information to the base station 42 shown in FIG. 1. The communication information contains information for specifying the mobile terminal 50, and identification information of the communication terminal device 10 which is a communication opponent of the mobile terminal 50. The identification information of the device is information for identifying the device, e.g., address information.

The base station 42 to which the communication information has been transmitted (later-described control section of the base station 42) holds the communication information, and transmits communication information to the low-order switching device 31 connected to the base station 42. The communication information sent to the low-order switching device 31 contains information for instructing transmission of data addressed to the mobile terminal 50 from the communication terminal device 10 to the base station 42, and identification information of the base station 42.

Then, the low-order switching device 31 (later-described first control section of the low-order switching device 31) holds the communication information, and transmits communication information to the high-order switching device 20.

The communication information sent to the high-order switching device 20 contains information for instructing transmission of data addressed to the mobile terminal 50 from the communication terminal device 10 to the low-order switching device 31, and identification information of the low-order switching device 31. Accordingly, the communication information is sent to the base station 42, the low-order switching device 31, and the high-order switching device 20.

Additionally, each of the low-order switching devices 31, 32 (later-described first control sections of the low-order switching devices 31, 32) holds identification information of the base stations 41, 42, . . . connected to the present device (the low-order switching device), and identification information of the high-order switching device 20 connected to the present device. The high-order switching device 20 (later-described first control section of the high-order switching device 20) holds identification information of the low-order switching devices 31, 32, . . . connected to the present device (the high-order switching device 20). The control sections of each of the base stations 41, 42, . . . holds the identification information of the low-order switching devices 31, 32 connected to the present device (the base station).

The data addressed to the mobile terminal 50 from the communication terminal device 10 is sent through each device (base station, each switching device) to the mobile terminal 50 as described above. However, the aforementioned communication method (i.e., method for sending the data to the mobile terminal 50 from the communication terminal device 10 based on the communication information) is only an example.

For example, the data may be transmitted through each device (base station, each switching device) to the mobile terminal 50 in the following manner.

A predetermined device manages identification information of each device, and identification information of a base station which executes radio communication with the mobile terminal 50. Each device accesses the predetermined device to be able to recognize the base station which executes the radio communication with the mobile terminal 50 or a switching device connected to the base station from among the devices connected to the device at the mobile terminal 50 side. When the data addressed to the mobile terminal 50 from the communication terminal device 10 is acquired by each device, the device transmits the data to the recognized device. Accordingly, the data addressed to the mobile terminal 50 from the communication terminal device 10 may be sent through each device (base station, each switching device) to the mobile terminal 50.

Subsequently, the communication terminal device 10 sends the data (packet data) addressed to the mobile terminal 50 to the high-order switching device 20.

The high-order switching device 20 can send the data to the low-order switching device (e.g., low-order switching device 31) connected to a base station (e.g., base station 42) which executes the radio communication with the mobile terminal 50 based on the held communication information and the identification information of the low-order switching devices 31, 32 connected to the high-order switching device 20. Upon acquisition of the data, the low-order switching device 31 carries out the following processing. The low-order switching device 31 can transmit the data to the base station 42 which executes the radio communication with the mobile terminal 50 based on the held communication information and the identification information of the base station 42 connected to the low-order switching device 31. The base station 42 can transmit the data to the mobile terminal 50 based on the communication information.

During communication between the mobile terminal 50 and the communication terminal device 10, when the mobile terminal 50 moves and a base station which is radio communication opponent of the mobile terminal 50, the following processing is carried out. For example, as shown in FIG. 3, the mobile terminal 50 transmits communication information indicating execution of radio communication with the plurality of base stations 42, 43 and 44 to each of the plurality of base stations. The communication information contains information for specifying the mobile terminal 50, and identification information of the communication terminal device 10 which is a communication opponent of the mobile terminal 50. The base stations 42, 43 and 44 to which the communication information has been transmitted hold the communication information, and sends communication information to the low-order switching devices 31 connected to the base stations 42, 43 and the low-order switching devices 32 connected to the base stations 44. The communication information to be sent to the low-order switching devices 31, 32 contains information for instructing transmission of data addressed to the mobile terminal 50 from the communication terminal device 10 to each of the base stations 42, 43 and identification information of each of the base stations 42, 43. The communication information sent to the low-order switching devices 32 contains information for instructing transmission of data addressed to the mobile terminal 50 from the communication terminal device 10 to the base stations 44, and identification information of the base station 44.

Each of low-order switching devices 31, 32 holds the communication information, and transmits communication information to the high-order switching device 20. The communication information to be sent to the high-order switching device 20 contains information for instructing transmission of data addressed to the mobile terminal 50 from the communication terminal device 10 to the low-order switching devices 31, 32, and identification information of the low-order switching devices 31, 32. Thus, the communication information is sent to the plurality of base stations 42, 43 and 44, the plurality of low-order switching devices 31, 32, and the high-order switching device 20.

By the aforementioned process, a soft handover processing is carried out by the mobile terminal 50 in the communication between the mobile terminal 50 and the communication terminal device 10. That is, in the communication between the mobile terminal 50 and the communication terminal device 10, the mobile terminal 50 executes radio communication with a plurality of base stations (e.g., base stations 42, 43 and 44). Thus, the embodiment is based on the assumption that the mobile terminal 50 executes radio communication with a plurality of base stations. The embodiment will be described by way of example in which the mobile terminal 50 executes radio communication with the plurality of base stations 42, 43 and 44 as shown in FIG. 3.

According to the embodiment, in the communication between the mobile terminal 50 and the communication terminal device 10, when the mobile terminal 50 moves to execute radio communication with a plurality of base stations (e.g., base stations 42, 43 and 44 shown in FIG. 1) connected to the different low-order switching devices 31, 32, the plurality of switching devices (high-order switching device 20, low-order switching device 31) can carry out multicast communication. Hereinafter, description will be made of a configuration of each device and a communication method in the embodiment in which in the communication between the mobile terminal 50 and the communication terminal device 10, the mobile terminal 50 executes radio communication with a plurality of base stations and a plurality of switching devices execute multicast communication.

(High-Order Switching Device 20)

Figure 4:
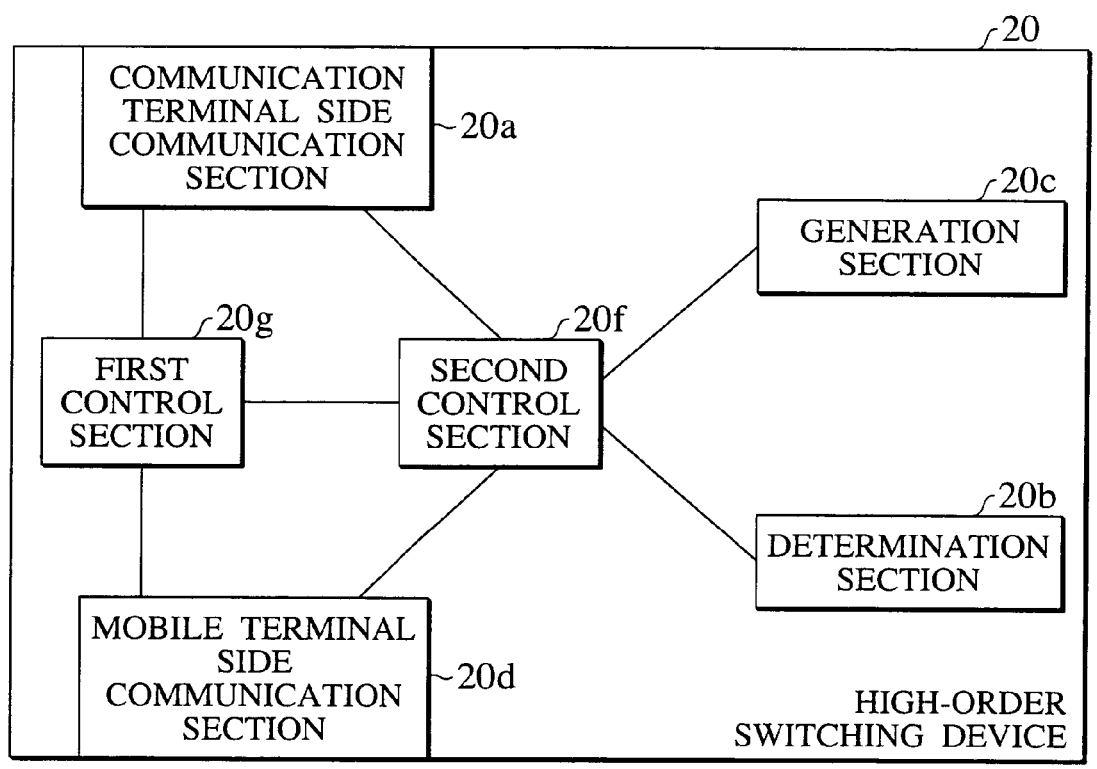
FIG. 4 is a view showing a configuration of a high-order switching device of the embodiment.

FIG. 4 is a view showing a configuration of the high-order switching device 20. The high-order switching device 20 includes a communication terminal side communication section 20*a* for receiving packet data transmitted from the communication terminal device 10, a determination section 20*b*, a generation section 20*c*, a mobile terminal side communication section 20*d*, a second control section 20*f* for controlling the communication terminal side communication section 20*a*, the mobile terminal side communication section 20*d*, the generation section 20*c* and the determination section 20*b*, and a first control section 20*g* for controlling the mobile terminal side communication section 20*d*, the communication terminal side communication section 20*a* and the second control section 20*f*.

The first control section 20*g* holds identification information (e.g., address information) of the plurality of low-order switching devices 31, 32, . . . connected to the high-order switching device 20. Upon acquisition of communication information (containing information for specifying the mobile terminal 50, identification information of the communication terminal device 10, identification information of base stations which executes radio communication with the mobile terminal 50, and identification information of the low-order switching devices 31, 32 connected to the base station) from the plurality of low-order switching devices 31, 32, the first control section 20*g* carries out the following processing.

Based on the identification information of the plurality of low-order switching devices 31, 32 and the communication information the first control section 20*g* determines that the high-order switching device 20 transmits packet data to the plurality of low-order switching devices 31, 32 in a multicast manner. Then, the first control section 20*g* holds multicast information indicating that the high-order switching device 20 transmits the packet data to the plurality of low-order switching devices 31, 32 in the multicast manner.

A function of the high-order switching device 20 (referred to as a multipath point (MP) high-order switching device 20 hereinafter) when the first control section 20*g* holds the multicast information is different from that of the high-order switching device 20 (referred to as a unipath point (UP) high-order switching device 20 hereinafter) when the first control section 20*g* does not hold the multicast information. Incidentally, the low-order switching device when the first control section of the low-order switching device holds the multicast information is referred to as a multipath point (MP) low-order switching device hereinafter.

Hereinafter, a description will be made based on the classification of the function of the MP high-order switching device 20 and the function of the UP high-order switching device 20. In the UP high-order switching device 20, the determination section 20*b*, the generation section 20*c* and the second control section 20*f* are not operated. Upon acquisition of the communication information from one low-order switching device, the first control section 20*g* of the UP high-order switching device 20 carries out the following processing when the identification information of the low-order switching device contained in the communication information coincides with any of pieces of identification information of the low-order switching devices held by the first control section 20*g*. The first control section 20*g* instructs the mobile terminal side communication section 20*d* to transmit the data addressed to the mobile terminal 50 to the low-order switching device based on the information for specifying the mobile terminal 50 contained in the communication information. When packet data is transmitted to the communication terminal side communication section 20*a* of the UP high-order switching device 20, the packet data is sent through the first control section 20*g* to the mobile terminal side communication section 20*d*. The mobile terminal side communication section 20*d* transmits the packet data to the low-order switching device based on address information (information for specifying the mobile terminal 50) contained in the packet data.

In the MP high-order switching device 20, the second control section 20*f*, the generation section 20*c* and the determination section 20*b* are operated. The second control section 20*f* acquires the multicast information and the communication information sent from the first control section 20*g*. In this event, pieces of identification information of a plurality of devices (devices which are destinations of the multicast transmission of the MP high-order switching device 20) are sent. Then, the second control section 20*f* instructs the mobile terminal side communication section 20*d* to transmit the packet data (packet data sent from the communication terminal device 10 to the mobile terminal 50) to the plurality of devices in a multicast manner. Details will be described later.

The second control section 20*f* of the MP high-order switching device 20 holds pieces of identification information of the plurality of base stations 42, 43 and 44 (identification information of the plurality of base stations which execute radio communication with the mobile terminal 50) contained in the acquired communication information. Additionally, the second control section 20*f* holds the number of devices (2 in the case of FIG. 1) which are destinations of multicast transmission of the MP high-order switching device 20.

(Determination Section 20*b*)

The determination section 20*b* carries out the following processing based on a time period necessary for transmission of packet data from each (e.g., MP high-order switching device 20, MP low-order switching device 31) of one or more of a plurality of switching devices which execute multicast transmission to one or more base stations (e.g., base stations 42, 43 and 44) connected to the switching device (e.g., MP high-order switching device 20, MP low-order switching device 31), and a time period necessary for transmission of the packet data from each (e.g., MP high-order switching device 20) of one or more of the plurality of switching devices to one or more switching devices (e.g., MP low-order switching device 31) connected to the switching device (e.g., MP high-order switching device 20) at mobile terminal 50 side. In order to set timing of data reception of the mobile terminal 50 to be simultaneous among the plurality of base stations 42, 43 and 44, the determination section 20*b* determines transmission timing at which each of the switching devices (e.g., MP high-order switching device 20, MP low-order switching device 31) transmits the packet data to the plurality of devices (e.g., MP low-order switching device 31, base stations 42, 43 and 44) connected to the switching device (e.g., MP high-order switching device 20, MP low-order switching device 31).

To set timing of data reception of the mobile terminal 50 to be simultaneous among the plurality of base stations 42, 43 and 44, means to set timing of data reception of the mobile terminal 50 from each of base stations 42, 43 and 44 to be simultaneous.

Additionally, based on each determined transmission timing, in order to set timing of data reception of the mobile terminal 50 to be simultaneous among the plurality of base stations 42, 43 and 44, the determination section 20b determines reception timing at which each of the plurality of base stations receives the packet data and reception timing at which each of one or more of a plurality of second switching devices (e.g., MP low-order switching device 31) other than a first switching device (e.g., MP high-order switching device 20), which is closest to the communication terminal device 50 among a plurality of switching devices in the communication paths, receives the packet data.

The second control section 20f and the determination section 20b of the MP high-order switching device 20 carry out the following processes. The second control section 20f transmits a request of predetermined information through the mobile terminal side communication section 20d to each of the plurality of base stations 42, 43 and 44 which execute radio communication with the mobile terminal 50. Here, the second control section 20f has a function of measuring time (measuring function). The predetermined information includes information regarding time measurement at the base stations and regarding a sequence of pilot signals received by the mobile terminal 50 from the base stations.

The second control section 20f acquires the predetermined information from each of the base stations 42, 43 and 44, and sends the information to the determination section 20b. The determination section 20b carries out the following processing based on timing of the time measurement at the second control section 20f and the predetermined information acquired from each of the base stations 42, 43 and 44. In order to set timing of data reception of the mobile terminal 50 to be simultaneous among the plurality of base stations 42, 43 and 44, the determination section 20b determines timing at which each of the base stations 42, 43 and 44 transmits predetermined data (e.g., later-described radio slot data) to the mobile terminal 50, and timing at which the mobile terminal 50 receives the predetermined data (for details, see 3GTS 25.427 "UTRAN Iub/Iur interface user place protocol for DCH data streams").

The second control section 20f acquires time (processing time) necessary from reception of predetermined data (later-described packet data) by each of the base stations 42, 43 and 44 to transmission of predetermined data (later-described radio slot data) for each of the base station 42, 43 and 44. Each processing time is sent to the determination section 20b. The determination section 20b carries out the following processing based on each acquired processing time and the determined transmission timing. In order to set timing of data reception of the mobile terminal 50 to be simultaneous among the plurality of base stations 42, 43 and 44, the determination section 20b determines reception timing at which each of the base stations 42, 43 and 44 receives the predetermined data (later-described packet data).

The determination section 20b carries out the following processing based on a time period necessary for transmission of packet data from each of one or more of the plurality of switching devices (switching devices which execute multicast transmission) to one or more base stations connected to the switching device and a time period necessary for transmission of packet data from each (e.g. MP high-order switching device 20) of one or more of the plurality of switching devices to one or more switching devices (e.g. MP low-order switching device 31) connected to the switching device (e.g. MP high-order switching device 20) at the mobile terminal 50.

That is, the determination section 20b carries out the following processing so as to set timing of data reception of the mobile terminal 50 to be simultaneous among the plurality of base stations 42, 43 and 44. Specifically, the determination section 20b determines transmission timing at which each switching device (MP high-order switching device 20, MP low-order switching device 31) transmits data to the plurality of devices connected to the switching device. The aforementioned necessary time is time regarding a data transmission delay.

Figure 5:
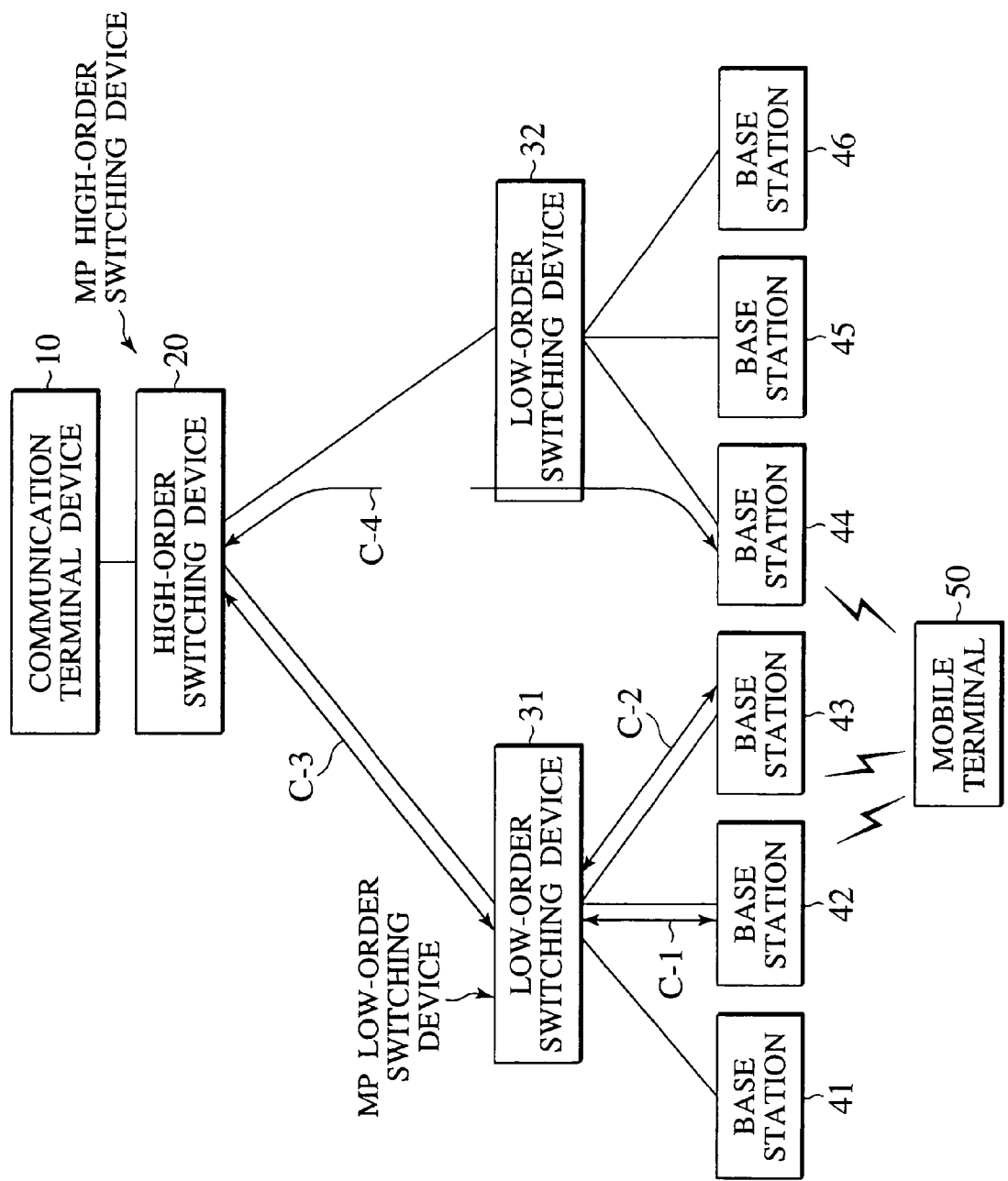
FIG. 5 is a supplemental view explaining a specific processing of a determination section of the embodiment.

FIG. 5 is a supplemental view explaining a specific determination processing by the determination section 20b.

For example, the determination section 20b sends a predetermined request to the MP low-order switching device 31. This predetermined request is a request of time (time corresponding to paths C-1, C-2) necessary for transmission of predetermined data form the MP low-order switching device 31 to each of the plurality of base stations 42 and 43.

The determination section 20b acquires the time period necessary for transmission of the predetermined data from the MP low-order switching device 31 to each of the plurality of base stations 42 and 43, from the MP low-order switching device 31. The determination section 20b acquires time (time corresponding to a path C-3) necessary for transmission of predetermined data from the MP high-order switching device 20 to the MP low-order switching device 31. Additionally, the determination section 20b acquires time (time corresponding to a path C-4) necessary for transmission of predetermined data from the MP high-order switching device 20, through the low-order switching device 32 which executes no multicast transmission, to the base station 44 (base station which executes radio communication with the mobile terminal 50).

Additionally, the second control section 20f of the MP high-order switching device 20 manages data processing time necessary from reception of predetermined data (later-described packet data) by the communication terminal side communication section 20a to transmission of the data from the mobile terminal side communication section 20d. For example, the second control section 20f carries out the aforementioned management processing by periodically monitoring the data processing time.

The determination section 20b of the MP high-order switching device 20 transmits a request of data processing time to the MP low-order switching device 31 and the plurality of base stations 42, 43, and 44. The determination section 20b of the MP high-order switching device 20 acquires data processing time sent from the MP low-order switching device 31 and each of the plurality of base stations 42, 43, and 44.

Incidentally, the determination section 20b recognizes the MP low-order switching device 31 and the plurality of base stations 42, 43 and 44 in the following manner. The second control section 20f of the MP high-order switching device 20 sends identification information of each of the base stations 41, 42, . . . which execute radio communication with the mobile terminal 50 to the determination section 20b. The second control section 20f transmits inquiry information to all the low-order switching devices 31, 32, . . . connected to the MP high-order switching device 20. This inquiry information indicates an inquiry as to whether the low-order switching devices execute multicast transmission or not in communication between the communication terminal device 10 and the mobile terminal 50. Each low-order switching device transmits response information including information indicating whether multicast transmission is to be executed and identification information of the low-order switching device to the MP high-order switching device 20 based on the inquiry information. The second control section 20f of the MP high-order switching device 20 acquires identification information of the low-order switching device 31 which executes multicast transmission based on the response information transmitted from each low-order switching device. Then, the second control section 20f sends the identification information of the MP low-order switching device 31 to the determination section 20b. Accordingly, the determination section 20b recognizes the MP low-order switching device 31 and the plurality of base stations 42, 43, and 44.

The determination section 20b receives a time period necessary for transmission of predetermined data (e.g., later-described packet data) from the MP low-order switching device 31 to each of the plurality of base stations 42 and 43, a time period necessary for transmission of predetermined data from the MP high-order switching device 20 to the MP low-order switching device 31, a time period necessary for transmission of predetermined data from the MP high-order switching device 20 through the low-order switching device 32 which executes no multicast transmission to the base station 44 (base station which executes radio communication with the mobile terminal 50), data processing time corresponding to each of the devices (MP high-order switching device 20, the MP low-order switching device 31, and each of base stations 42, 43, and 44), identification information of each of base stations 42, 43, and 44 which execute radio communication with the mobile terminal 50, and identification information of the MP low-order switching device 31.

Subsequently, the determination section 20b carries out the following processing based on each received information. The determination section 20b carries out the following processing so that each of base stations 42, 43, and 44 can receive predetermined data at reception timing (reception timing which has been determined) corresponding to each of the base stations 42, 43, 44. The determination section 20b determines transmission timing at which each switching device that executes multicast transmission (e.g., MP high-order switching device 20 or MP low-order switching device 31) transmits the predetermined data to the plurality of devices connected to the switching device, and reception timing at which the MP low-order switching device 31 receives the predetermined data.

For example, in the case shown in FIG. 5, data sent from the communication terminal device 10 is transmitted through each of the base stations 42, 43, and 44 to the mobile terminal 50. Here, a time period necessary for transmission of predetermined data (e.g., later-described packet data) from the MP high-order switching device 20 to the MP low-order switching device 31 is T1. A time period necessary for transmission of predetermined data from the MP high-order switching device 20 through the low-order switching device 32 to the base station 44 is T2. Time periods necessary for transmission of predetermined data from the MP low-order switching device 31 to the base stations 42, 43 are T3, T4, respectively. Processing time of predetermined data in the MP low-order switching device 31 is t1.

In this case, as communication paths for transmission of the predetermined data from the MP high-order switching device 20 to the base stations 42, 43, and 44, as shown in FIG. 5, there are a communication path 1 constituted of paths C-3 and C-1, a communication path 2 constituted of paths C-3 and C-2, and a communication path 3 constituted of a path C-4.

In the case of the communication path 1, a time period necessary for transmission of the predetermined data from the MP high-order switching device 20 to the base station 42 is T1+t1+T3=S1. In the case of the communication path 2, a time period necessary for transmission of the predetermined data from the MP high-order switching device 20 to the base station 43 is T1+t1+T4=S2. In the case of the communication path 3, a time period necessary for transmission of the predetermined data from the MP high-order switching device 20 to the base station 44 is T2.

The determination section 20b carries out the following processing based on the time S1, S2, T2, and the reception timings of the base stations 42, 43 and 44 each of which has been determined. In order to set timing at which each of the base stations 42, 43, and 44 receive the predetermined data through the communication paths 1, 2 and 3 to be simultaneous to the reception timing of each of the base stations 42, 43 and 44, which has been determined by the determination section 20b, the determination section 20b determines transmission/reception timing of the predetermined data corresponding to the MP high-order switching device 20, and transmission/reception timing of the predetermined data corresponding to the MP low-order switching device 31.

For example, in the case of the communication system shown in FIG. 5, the determination section 20b determines timing at which the MP high-order switching device 20 transmits predetermined data (later-described packet data) to the MP low-order switching device 31 to be W1. The determination section 20b determines timing at which the MP high-order switching device 20 transmits predetermined data to the base station 44 (low-order switching device 32) to be W2. The determination section 20b determines timing at which the MP low-order switching device 31 receives the predetermined data from the MP high-order switching device 20 to be W3. The determination section 20b determines timing at which the base station 44 receives the predetermined data from the MP high-order switching device 20 (low-order switching device 32) to be W4. The determination section 20b determines timing at which the MP low-order switching device 31 transmits predetermined data to the base stations 42 and 43 to be W5 and W6, respectively. The determination section 20b determines timing at which the base stations 42 and 43 receive the predetermined data from the MP low-order switching device 31 to be W7, W8 respectively.

The transmission timing or the reception timing determined by the determination section 20b is associated with the identification information of a device related to the transmission timing or the reception timing. For example, transmission timing "W5" is related to the MP low-order switching device 31. For example, reception timing "W7" is related to the base station 42. Then, the transmission timing and the reception timing are transmitted to the respective devices. For example, the mobile terminal side communication section 20d transmits each transmission timing determined by the determination section 20b to the corresponding switching device (e.g., MP low-order switching device 31) which executes multicast transmission.

Incidentally, the transmission timing of the MP high-order switching device 20 is sent to the second control section 20f. When the mobile terminal side communication section 20d transmits data sent from the communication terminal device 10 to the mobile terminal 50 to a plurality of devices (e.g., MP low-order switching devices 31, base station 44) in a multicast manner, the second control section 20f instructs the mobile terminal side communication section 20d to transmit the data at the transmission timing determined by the determination section 20b. In this event, information indicating the transmission timing determined by the determination section 20b (transmission timing information hereinafter) is held in the mobile terminal side communication section 20d.

The mobile terminal side communication section 20d transmits (multicast transmission) packet data to the devices which are multicast transmission destinations of the MP high-order switching device 20 (plurality of devices connected to the MP high-order switching device 20) based on the transmission timing determined by the determination section 20b.

Incidentally, the determination processing and the transmission processing of the transmission timing and of the reception timing, are carried out for each transmission of communication information from the plurality of devices connected to the MP high-order switching device 20.

Furthermore, when the mobile terminal 50 moves to be disabled to receive data from the plurality of base stations 42, 43, and 44 at the simultaneous timing while base stations 42, 43 and 44 execute radio communication with the mobile terminal 50, for example, the following processing is carried out. Information indicating impossibility of data reception at the simultaneous timing is transmitted to each of the base stations 42, 43, and 44. The base stations 42, 43 and 44 acquire the predetermined information (aforementioned information regarding the time measurement, information regarding a sequence of pilot signals) again, and send the predetermined information to the determination section 20b of the MP high-order switching device 20, respectively. The determination section 20b determines transmission timing of each base station and reception timing of the mobile terminal 50 based on the predetermined information so that the mobile terminal 50 can receive data from each of the base stations 42, 43, and 44 by simultaneous timing. In this event, the reception timing of each of the base stations 42, 43, and 44 is not changed (for details, see 3G TS 25.427 "UTRAN Iub/Iur interface user place protocol for DCH data streams").

Subsequently, the determination section 20b transmits the newly determined transmission timing of each of the base stations 42, 43 and 44 through the mobile terminal side communication section 20d to the corresponding base station, and the reception timing of the mobile terminal 50 through the mobile terminal side communication section 20d to the mobile terminal 50.

(Generation Section)

The generation section 20c generates a plurality of radio slot data based on packet data (transmission target packet data hereinafter) transmitted to the MP high-order switching device 20 (first switching device) which is closest to the communication terminal device 10 in the communication paths among the plurality of switching devices, and the number of devices which are multicast transmission destinations of the MP high-order switching device 20.

Figure 6:
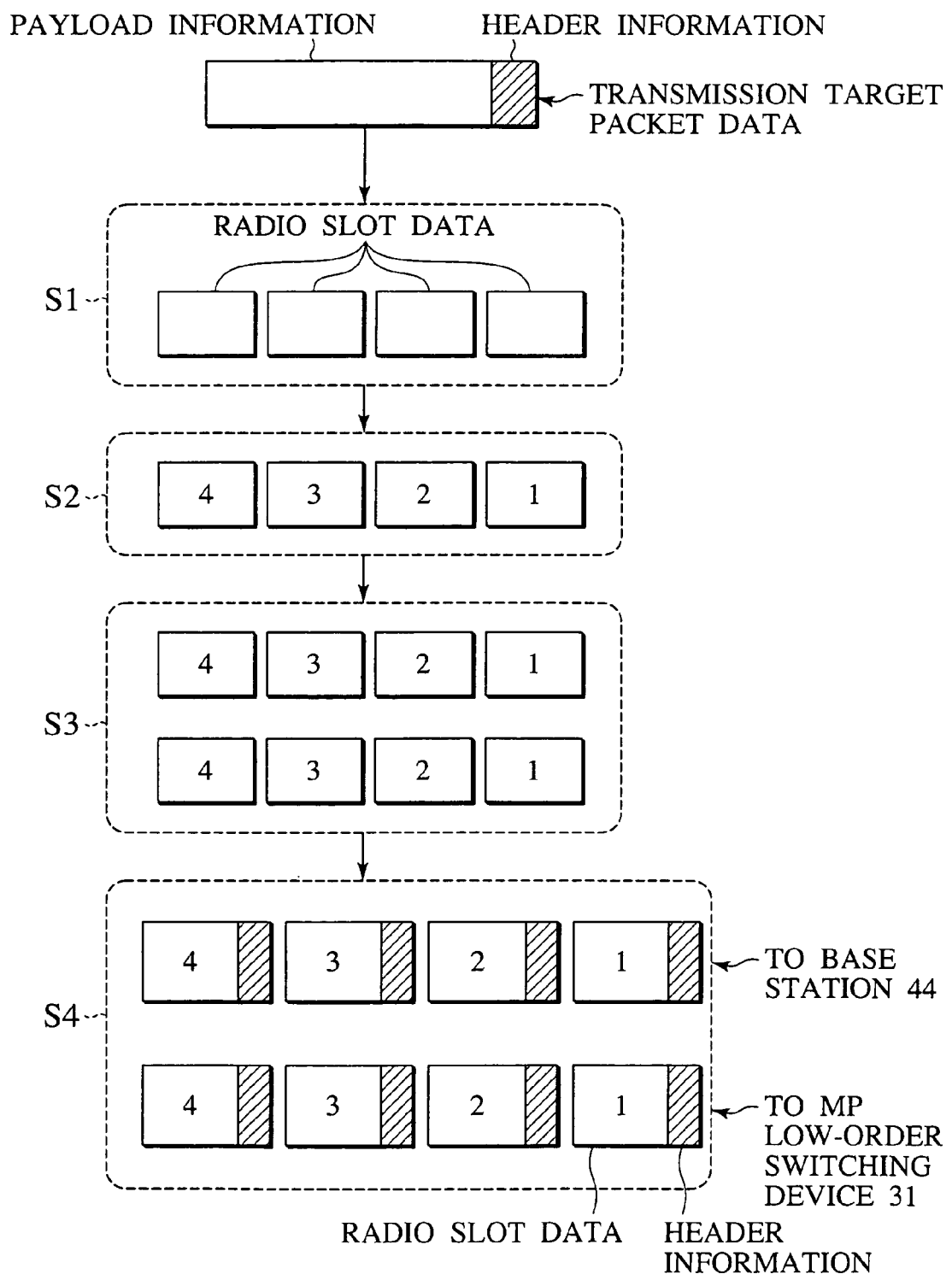
FIG. 6 is a supplemental view explaining a specific processing of a generation section of an MP high-order switching device of the embodiment.

FIG. 6 is a supplemental view explaining a specific generation processing in the generation section 20c. Predetermined transmission target packet data (may be referred to as L3 packet data, IP packet data) is transmitted from the communication terminal device 10 to the communication terminal side communication section 20a. The predetermined transmission target packet data contains header information and payload information. The header information contains information (address information) for specifying the mobile terminal 50, and identification information (transmission source information) of the communication terminal device 10. The predetermined transmission target packet data is sent through the second control section 20f to the generation section 20c. In this event, the number of devices which are multicast transmission destinations of the MP high-order switching device 20 is sent to the generation section 20c. For example, in the case shown in FIG. 5, the number of devices which are multicast transmission destinations of the MP high-order switching device 20 is two. Additionally, the first control section 20g sends information indicating execution of multicast transmission to the base station 44 and the MP low-order switching device 31 (this information contains identification information of the low-order switching device 32, identification information of the base station 44, and identification information of the MP low-order switching device 31), and information indicating that data transmission is from the communication terminal device 10 to the mobile terminal 50, through the second control section 20f, to the generation section 20c based on the header information.

The generation section 20c divides the predetermined transmission target data into a predetermined number (e.g., 4) to generate the predetermined number of radio slot data (radio L2 frame) (S1). In this event, the generation section 20c provides transmission sequence information (sequence number, e.g., 1, 2, 3, 4) indicating a transmission sequence to the generated radio slot data (S2). This transmission sequence information is equivalent to, e.g., a connection frame number (CFN) in the W-CDMA. Here, pieces of transmission sequence information, which correspond to radio slot data simultaneously transmitted from the base stations 42, 43 and 44 to the mobile terminal 50, are identical with one another.

Subsequently, the generation section 20c generates the predetermined number of radio slot data which is equal to the number of devices (e.g., 2) of the multicast transmission destinations (S3). Then, the generation section 20c generates each packet data which contains radio slot data (S4).

The specific process is as follows. For example, as shown in FIG. 6, a consideration is given to a case in which the number of devices of multicast transmission destinations is two, the predetermined number is four, and the devices of the multicast transmission destinations are the base station 44 and the MP low-order switching device 31.

The generation section 20c generates a plurality (four) of packet data which contains radio slot data (radio slot data corresponding to the transmission sequence 1 to 4), header information (identification information (address information) of the base station 44), and information indicating that data transmission is from the communication terminal device 10 to the mobile terminal 50.

Additionally, the generation section 20c generates a plurality (four) of packet data which contains radio slot data (radio slot data corresponding to the transmission sequence 1 to 4), header information (identification information (address information) of the MP low-order switching device 31), and information indicating that data transmission is from the communication terminal device 10 to the mobile terminal 50. Each packet data generated by the generation section 20c is sent to the second control section 20f. The second control section 20f sends each packet data to the mobile terminal side communication section 20d.

The mobile terminal side communication section 20d transmits the packet data to the plurality of devices (low-order switching device 31, base station 44) connected to the MP high-order switching device 20 based on the transmission timing determined by the determination section 20b. Specifically, the mobile terminal side communication section 20d transmits each packet data generated by the generation section 20c to the plurality of devices connected to the MP high-order switching device 20 at the transmission timing determined by the determination section 20b (transmission timing corresponding to the MP high-order switching device 20) based on the header information of each packet data and the held transmission timing information. The specific processing is as follows.

For example, it is assumed that the determination section 20b determines timing at which the MP high-order switching device 20 transmits one packet data to the MP low-order switching device 31 to be W1, and timing at which the MP high-order switching device 20 transmits one packet data to the base station 44 to be W2. The mobile terminal side communication section 20*d* holds information indicating the transmission timing W1 and W2.

In this case, the mobile terminal side communication section 20*d* transmits each packet data addressed to the MP low-order switching device 31 at the transmission timing W1. Additionally, the mobile terminal side communication section 20*d* transmits each packet data addressed to the base station 44 at the transmission timing W2.

It is assumed that the transmission timing W1 is, e.g., X1+NT (X is predetermined hour timing, N is an integer, and T is cycle time). In this case, the mobile terminal side communication section 20*d* transmits each packet data addressed to the MP low-order switching device 31 in accordance with the transmission timing. It is also assumed that the transmission timing W2 is, e.g., X2+NT (X2 is predetermined hour timing, N is an integer, and T is cycle time). In this case, the mobile terminal side communication section 20*d* transmits each packet data addressed to the base station 44 in accordance with the transmission timing. T of the W1 is equal in value T of the W2. N is a value corresponding to transmission target information. For example, the mobile terminal side communication section 20*d* transmits packet data corresponding to transmission target information 1 to the base station 44 by transmission timing X2+1?T.

(Low-order Switching Device)

Figure 7:
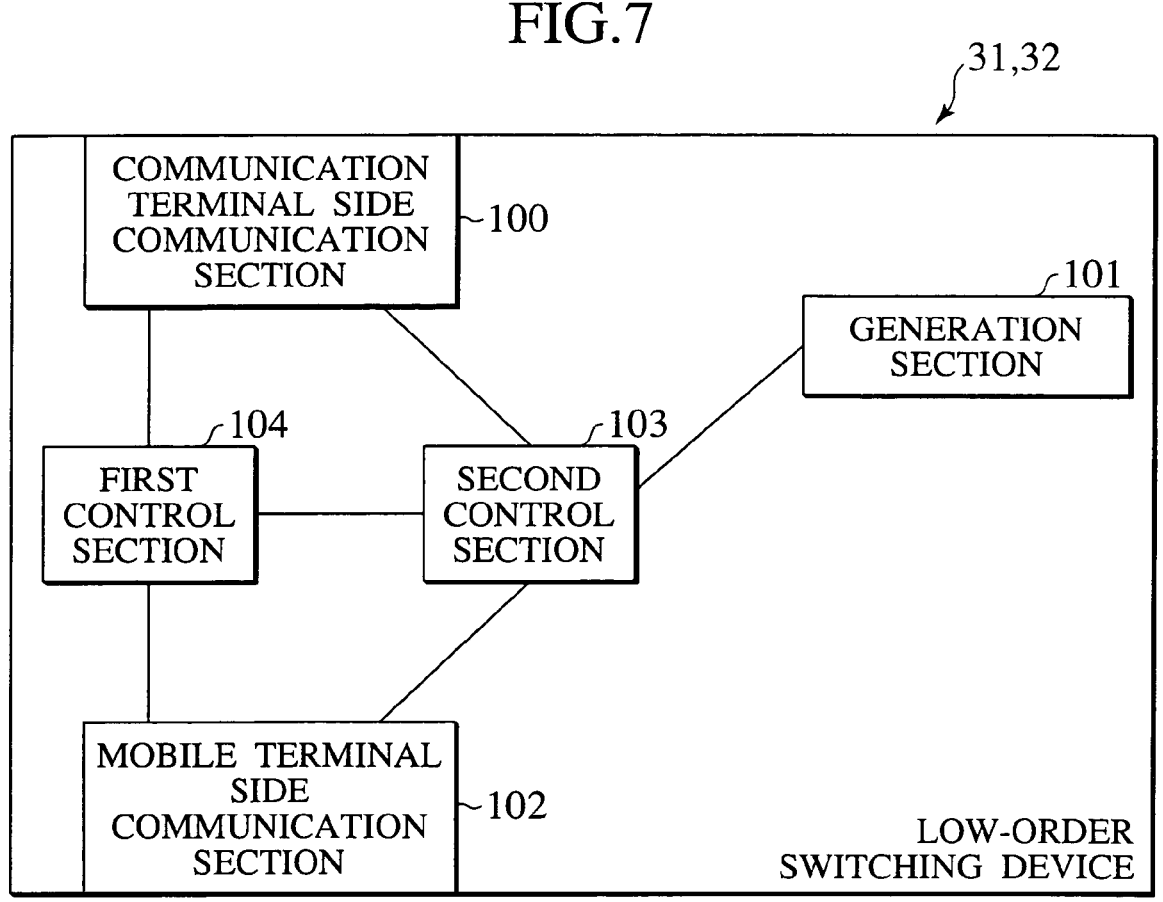
FIG. 7 is a view showing a low-order switching device of the embodiment.

FIG. 7 is a view showing a configuration of each of the low-order switching devices 31, 32, . . . . Each of the low-order switching devices 31, 32 includes a communication terminal side communication section 100 for receiving packet data transmitted from the high-order switching device 20 (MP high-order switching device 20), a generation section 101, a mobile terminal side communication section 102, a second control section 103 for controlling the communication terminal side communication section 100, the mobile terminal side communication section 102 and the generation section 101, and a first control section 104 for controlling the mobile terminal side communication section 102, the communication terminal side communication section 100 and the second control section 103.

The first control section 104 holds identification information (e.g., address information) of a plurality of base stations connected to the low-order switching device. The first control section 104 carries out the following processing upon acquisition of communication information (containing information for specifying the mobile terminal 50, identification information of the communication terminal device 10, and identification information of a base station which executes radio communication with the mobile terminal 50).

The first control section 104 determines, based on the identification information of the plurality of base stations and the communication information, that the low-order switching device transmits packet data to the plurality of base stations in a multicast manner. Then, the first control section 104 holds multicast information indicating that the low-order switching device is to transmit the packet data to the plurality of base stations in the multicast manner.

A function of the low-order switching device 31 (referred to as MP low-order switching device 31 hereinafter) when the first control section 104 holds the multicast information is different from that of the low-order switching device 32 (referred to as a unipath point (UP) low-order switching device 32 hereinafter) when the first control section 104 does not hold the multicast information. Hereinafter, description will be made based on the classification of the function of the MP low-order switching device 31 and the function of the UP low-order switching device 32.

In the UP low-order switching device 32, the generation section 101 and the second control section 103 are not operated. The function of the first control section 104 of the UP low-order switching device 32 is equivalent to the function of the first control section 20*g* of the UP high-order switching device 20 in a case in which the low-order switching device is replaced by a base station. However, upon acquisition of the inquiry information from the MP high-order switching device 20, the first control section 104 transmits response information which contains information indicating nonexecution of multicast transmission and identification information of the UP low-order switching device 32 to the MP high-order switching device 20.

In the MP low-order switching device 31, the second control section 103 and the generation section 101 are operated. The second control section 103 acquires multicast information and communication information sent from the first control section 104. In this event, pieces of identification information of devices which are destinations of multicast transmission of the MP low-order switching device 31 are sent to the second control section 103. Then, the second control section 103 instructs the mobile terminal side communication section 102 to transmit packet data (packet data sent from the communication terminal device 10 to the mobile terminal 50) to the plurality of base stations 42 and 43 in a multicast manner.

The second control section 103 of the MP low-order switching device 31 holds pieces of identification information of the plurality of base stations 42 and 43 which execute radio communication with the mobile terminal 50 based on information for specifying the base stations 42 and 43 corresponding to the acquired communication information. Additionally, the second control section 103 holds information on the number (two) of devices (base stations 42 and 43) which are destinations of multicast transmission of the MP low-order switching device 31.

The second control section 103 instructs the mobile terminal side communication section 102 to transmit data sent from the communication terminal device 10 to the mobile terminal 50 to the plurality of base stations 42 and 43 in a multicast manner.

The second control section 103 of the MP low-order switching device 31 carries out the following processing. The second control section 103 acquires information sent from the MP high-order switching device 20 (request of time necessary for transmission of packet data from the MP low-order switching device 31 to the plurality of base stations 42 and 43). The second control section 103 measures a time period necessary for transmission of the packet data from the MP low-order switching device 31 to each of the plurality of base stations 42 and 43. The second control section 103 transmits the measured time through the communication terminal side communication section 100 to the MP high-order switching device 20.

Additionally, the second control section 103 of the MP low-order switching device 31 manages data processing time necessary from reception of packet data by the communication terminal side communication section 100 to transmission of the data from the mobile terminal side communication section 102. For example, the second control section 103 carries out the aforementioned management process by periodically monitoring the data processing time.

Then, upon acquisition of the request of data processing time from the MP high-order switching device 20, the second control section 103 transmits the data processing time through the communication terminal side communication section 100 to the MP high-order switching device 20.

Incidentally, upon acquisition of the inquiry information from the MP high-order switching device 20, the first control section 104 transmits response information which contains information indicating execution of multicast transmission and identification information of the MP low-order switching device 31.

The second control section 103 acquires information indicating transmission timing and reception timing, which has been sent from the MP high-order switching device 20. That is, in order to set data reception timing of the mobile terminal 50 to be simultaneous among the plurality of base stations 42, 43 and 44, the second control section 103 acquires transmission timing of packet data from a device (e.g., MP high-order switching device 20) for determining transmission timing at which each of the plurality of switching devices (MP high-order switching device 20, MP low-order switching device 31) transmit packet data to a plurality of devices (MP low-order switching device 31, base stations 42, 43, and 44) connected to the switching device.

Additionally, in order to set data reception timing of the mobile terminal 50 to be simultaneous among the plurality of base stations 42, 43 and 44, the second control section 103 acquires reception timing corresponding to the present device (low-order multicast switching device) when reception timing is determined by which each of one or a plurality of low-order switching devices (e.g., MP low-order switching device 31) other than a switching device (MP high-order switching device 20), which is closest to the communication terminal device 10 among a plurality of switching devices (MP high-order switching device 20, MP low-order switching device 31) in the communication paths, receives packet data.

Then, when the communication terminal side communication section 100 receives the packet data (packet data sent from the communication terminal device 10 to the mobile terminal 50) from the MP high-order switching device 20, the second control section 103 instructs the communication terminal side communication section 100 to receive the data by the reception timing determined by the determination section 20b. In this event, information indicating the reception timing (reception timing information hereinafter) determined by the determination section 20b is held in the communication terminal side communication section 100.

When the mobile terminal side communication section 102 transmits the packet data (packet data sent from the communication terminal device 10 to the mobile terminal 50) to the plurality of base stations 42 and 43 in a multicast manner, the second control section 103 instructs the mobile terminal side communication section 102 to transmit the data at the transmission timing determined by the determination section 20b. In this event, information indicating the transmission timing (transmission timing information hereinafter) determined by the determination section 20b is held in the mobile terminal side communication section 102.

The communication terminal side communication section 100 receives the packet data (packet data sent from the communication terminal device 10 to the mobile terminal 50) transmitted from the MP high-order switching device 20 based on the reception timing determined by the determination section 20b. Additionally, the mobile terminal side communication section 100 transmits the packet data to the devices (base stations 42 and 43) which are multicast transmission destinations of the MP low-order switching device 31 based on the transmission timing determined by the determination section 20b in a multicast manner.

Figure 8:
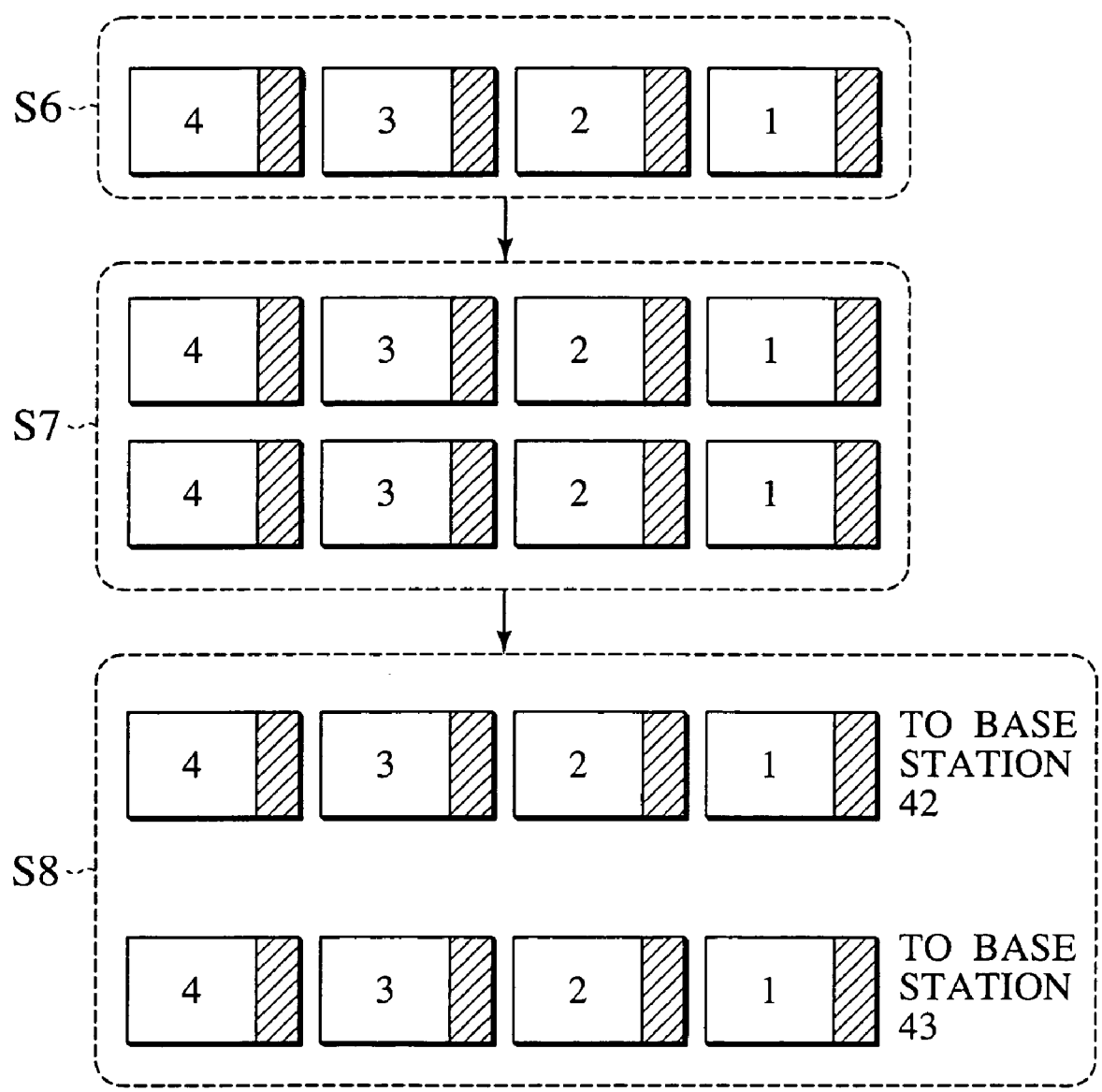
FIG. 8 is a supplemental view explaining a specific processing of a generation section of an MP low-order switching device of the embodiment.

The generation section 101 generates a plurality of packet data which contains radio slot data based on each packet data transmitted to the MP low-order switching device 31 (second switching device) other than the MP high-order switching device (first switching device) among the plurality of switching devices, and the number of devices of multicast transmission destinations of the MP low-order switching device 31. FIG. 8 is a supplemental view explaining a specific generation processing in the generation section 101.

Each packet data (e.g., packet data corresponding to transmission sequence information 1 to 4 as shown in FIG. 8) is transmitted from the MP high-order switching device 20 to the communication terminal side communication section 100 (S6). The second control section 103 acquires each packet data generated and transmitted by the MP high-order switching device 20 (switching device closest to the communication terminal device 10 among switching devices which execute multicast transmission). Each packet data is sent through the second control section 103 to the generation section 101. In this event, the number of devices (e.g., 2 in the case of FIG. 8) of multicast transmission destinations of the MP low-order switching device 31 is sent to the generation section 101.

The first control section 104 sends information (information contains identification information of base stations 42 and 43) indicating transmission of data (multicast transmission) to the plurality of base stations 42 and 43 through the second control section 103 to the generation section 101 based on information (information indicating execution of data transmission from the communication terminal device 10 to the mobile terminal 50) included in each packet data.

The generation section 101 generates packet data, the number of which is equal to the number of devices of multicast transmission destinations (S7). For example, when the number of devices of multicast transmission destinations is two, the generation section 101 copies packet data to generate an equal number of packet data to the number (e.g., two) of devices of multicast transmission destinations.

Then, the generation section 101 carries out a processing of converting header information of each packet data. The specific processing is as follows. For example, as shown in FIG. 5, a consideration is given to a case in which the number of devices of multicast transmission destination is two, and the device of multicast transmission destinations are base stations 42 and 43. The generation section 101 converts address information (identification information of the MP low-order switching device 31) contained in header information of one of two packet data with which transmission target information is identical into identification information of the base station 42.

Additionally, the generation section 101 converts address information (identification information of the MP low-order switching device 31) contained in header information of the other of the two packet data with which the transmission target information is identical into identification information of the base station 43. The generation section 101 sends each converted packet data to the second control section 103. The second control section 103 sends each packet data to the mobile terminal side communication section 102.

Incidentally, in the generation processing of the generation section 101, radio slot data contained in the packet data may be copied in place of the packet data.

The mobile terminal side communication section 102 transmits the packet data to the plurality of devices (base stations 42 and 43) connected to the MP low-order switching device 31 based on the transmission timing determined by the determination section 20b. Specifically, for example, the mobile terminal side communication section 102 carries out the following processing based on the header information of each packet data and the held transmission timing information. The mobile terminal side communication section 102 transmits the packet data (packet data from the communication terminal device 10 to the mobile terminal 50) generated by the generation section 101 to the plurality of devices connected to the MP low-order switching device 31 based on the transmission timing (transmission timing corresponding to the MP low-order switching device 31 (second switching device)) determined by the determination section 20b (S8).

The specific processing is as follows. For example, it is assumed that the determination section 20b determines timing at which the MP low-order switching device 31 transmits predetermined data (one packet data) to the base station 42 to be W10, and timing at which the MP low-order switching device 31 transmits predetermined data (packet data) to the base station 43 to be W20. The mobile terminal side communication section 102 holds information indicating the transmission timing W10, W20.

In this case, the mobile terminal side communication section 102 transmits each packet data addressed to the base station 42 at the transmission timing W10. Additionally, the mobile terminal side communication section 102 transmits each packet data addressed to the base station 43 at the transmission timing W20.

(Base Stations 41, 42, ...)

Figure 9:
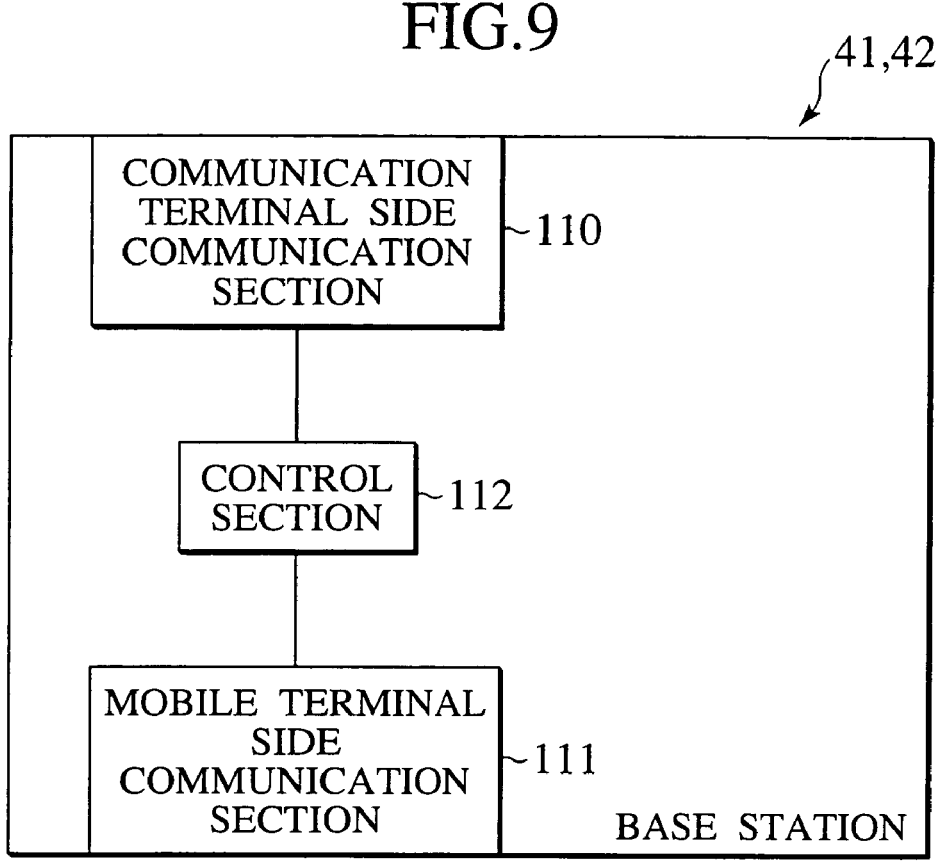
FIG. 9 is a view showing a configuration of a base station of the embodiment.

FIG. 9 is a view showing a configuration of each of the base stations 41, 42, . . . . Each of the base stations 41, 42, . . . includes a communication terminal side communication section 110 for receiving data from the low-order switching devices 31 and 32, a mobile terminal side communication section 111, and a control section 112 for controlling each section.

The control section 112 holds identification information of a low-order switching device connected to the present device (base station). The control section 112 transmits communication information transmitted from the mobile terminal 50 (communication information indicating execution of radio communication between the mobile terminal 50 and the base station) through the communication section 110 to the low-order switching device.

Upon acquisition of a request of predetermined information (information regarding time measurement at the base station, and information regarding a sequence of the pilot signals) transmitted from the MP high-order switching device 20, the control section 112 transmits the predetermined information through the communication terminal side communication section 110 to the MP high-order switching device 20.

The control section 112 manages data processing time which is a time period necessary from reception of predetermined data (aforementioned packet data) by the communication terminal side communication section 110 to transmission of predetermined data (aforementioned radio slot data) from the mobile terminal side communication section 111. Upon acquisition of a request of the data processing time from the MP high-order switching device 20, the control section 112 transmits the data processing time through the communication terminal side communication section 110 to the MP high-order switching device 20.

The control section 112 acquires information indicating transmission timing and reception timing, which is sent from the MP high-order switching device 20. When the communication terminal side communication section 110 receives the packet data sent from the communication terminal device 10 to the mobile terminal 50, the control section 112 instructs the communication terminal side communication section 110 to receive the data at the reception timing determined by the determination section 20b. In this event, the reception timing information indicating the reception timing determined by the determination section 20b is held in the communication terminal side communication section 110.

When the mobile terminal side communication section 111 transmits the radio slot data (radio slot data contained in the packet data sent from the communication terminal device 10 to the mobile terminal 50) to the mobile terminal 50, the control section 112 instructs the mobile terminal side communication section 111 to transmit the data at the transmission timing determined by the determination section 20b. In this event, the transmission timing information indicating the transmission timing determined by the determination section 20b is held in the mobile terminal side communication section 111.

The communication terminal side communication section 110 receives the packet data transmitted from the low-order switching device 31 (packet data sent from the communication terminal device 10 to the mobile terminal 50) based on the reception timing determined by the determination section 20b. Additionally, the mobile terminal side communication section 111 transmits the radio slot data contained in the packet data (data sent from the communication terminal device 10 to the mobile terminal 50) to the mobile terminal 50 based on the transmission timing determined by the determination section 20b.

(Mobile Terminal 50)

Figure 10:
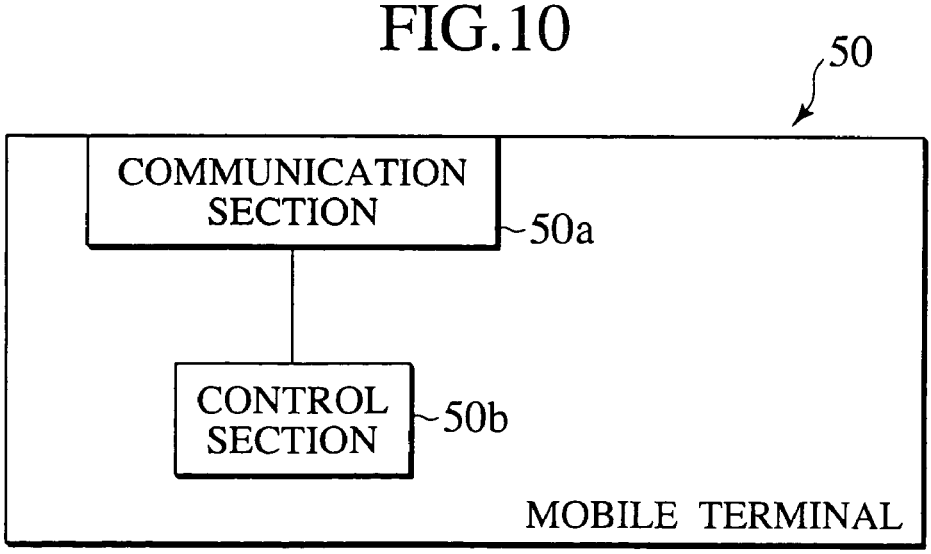
FIG. 10 is a view showing a configuration of a mobile terminal of the embodiment.

FIG. 10 is a view showing a configuration of the mobile terminal 50. The mobile terminal 50 includes a communication section 50a for receiving data (radio slot data) from a plurality of base stations, and a control section 50b for controlling the communication section 50a.

The control section 50b obtains reception timing information from the MP high-order switching device 20. When the communication section 50a receives radio slot data sent from each of the base stations 42, 43 and 44, the control section 50b instructs the communication section 50a to receive the data at reception timing determined by the determination section 20b. In this event, reception timing information indicating the reception timing determined by the determination section 20b is retained in the communication section 50a.

The communication section 50a receives the radio slot data transmitted from each of the base stations 42, 43 and 44 based on the reception timing (one simultaneous reception timing) determined by the determination section 20b. For example, the communication section 50a receives three radio slot data corresponding to the same transmission sequence information N (N is an integer), transmitted from the base stations 42, 43 and 44, at simultaneous timing. The received radio slot data is sent to the control section 50b.

When each of the plurality of base stations 42, 43 and 44 transmits radio slot data contained in each packet data to the mobile terminal 50, the control section 50b generates transmission target packet data based on the radio slot data transmitted from each of the plurality of base stations 42, 43 and 44.

The specific processing is as follows. For example, it is assumed that three (number of the plurality of base stations) radio slot data corresponding to transmission sequence information 1, 2, 3, . . . are transmitted to the control section 50b of the mobile terminal 50 at simultaneous timing. In this case, the control section 50b carries out the following processing for each transmission sequence information. That is, the control section 50*b* generates one radio slot data by performing well-known maximum ratio combining based on the three radio slot data.

The control section 50*b* combines the plurality of radio slot data (radio slot data corresponding to all the transmission sequence information 1, 2, 3, . . . ) which have been subjected to maximum ratio combining to generate transmission target packet data.

(Communication Method)

Now, description will be made of a communication method which uses the communication system of the embodiment. As described above, in the communication between the mobile terminal 50 and the communication terminal device 10, the information (communication information) indicating the execution of radio communication by the mobile terminal 50 with the plurality of base stations 42, 43 and 44 is sent to each switching device. As described above, the first control section 20*g* of the MP high-order switching device 20 and the first control section 104 of the MP low-order switching device 31 hold the multicast information while the first control section 104 of the low-order switching device 32 does not hold the multicast information. Additionally, as described above, the identification information of the MP low-order switching device 31 and the identification information of each of the base stations 42, 43 and 44 are sent to the determination section 20*b* of the MP high-order switching device 20.

Figure 11:
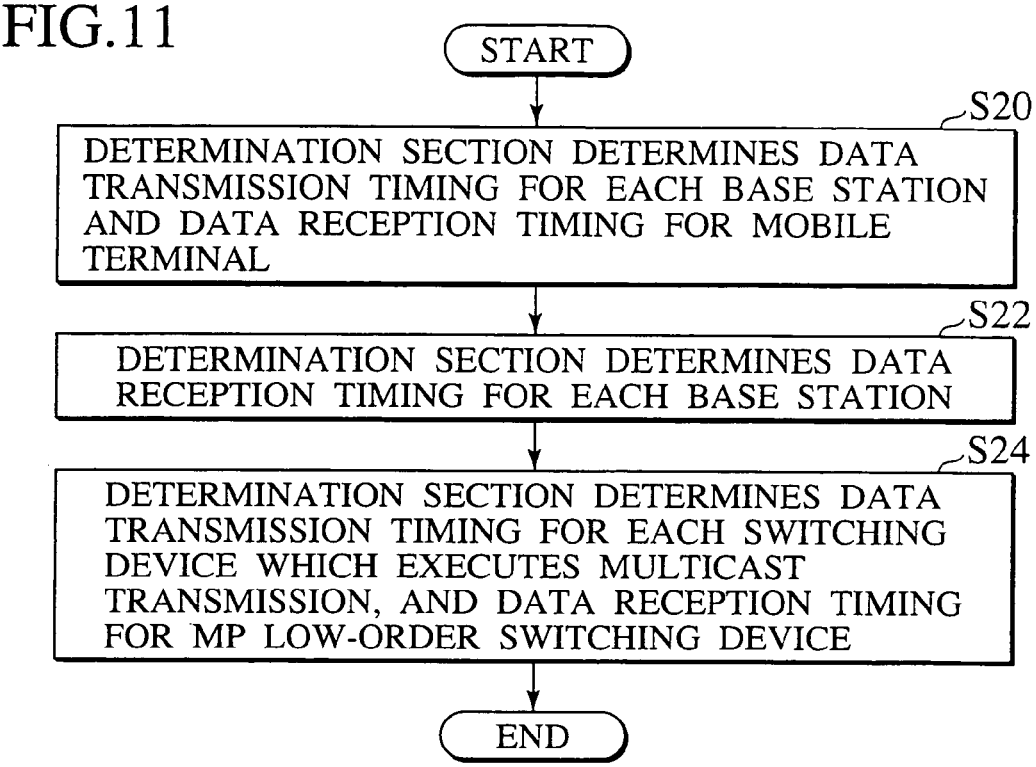
FIG. 11 is a flowchart partially explaining a communication method of an embodiment.

Then, the determination section 20*b* of the MP high-order switching device 20 carries out the following determination processing. FIG. 11 is a flowchart explaining the determination processing of the determination section 20*b*.

The second control section 20*f* and the determination section 20*b* of the MP high-order switching section 20 carry out the following processing. The second control section 20*f* acquires predetermined information from the plurality of base stations 42, 43 and 44 which execute radio communication with the mobile terminal 50, and sends the predetermined information to the determination section 20*b*. Then, in order to set data reception timing of the mobile terminal 50 to be simultaneous among the plurality of base stations 42, 43 and 44, the determination section 20*b* determines timing at which each base station transmits predetermined data (e.g., later-described radio slot data) to the mobile terminal 50, and timing at which the mobile terminal 50 receives the predetermined data based on the acquired predetermined information (S20).

Subsequently, the second control section 20*f* acquires processing time necessary from reception of predetermined data (packet data) by each base station to transmission of predetermined data (radio slot data) from the control section 112 of the base stations 42, 43 and 44. Each processing time is sent to the determination section 20*b*.

The determination section 20*b* carries out the following processing based on the acquired processing time and the determined transmission time. In order to set data reception timing of data by the mobile terminal 50 to be simultaneous among the plurality of base stations 42, 43 and 44, the determination section 20*b* determines reception timing at which each of the base stations 42, 43 and 44 receives predetermined data (e.g., packet data) (S22).

The determination section 20*b* carries out the following processing so that each of base stations 42, 43 and 44 can receive the predetermined data at the reception timing determined by the determination section 20*b*. The determination section 20*b* determines transmission timing at which each switching device (MP high-order switching device 20 and MP low-order switching device 31), which executes multicast transmission, transmits the predetermined data to each of the plurality of devices connected to the switching device, and reception timing at which the MP low-order switching device 31 receives the predetermined data (S24).

The transmission timing or the reception timing determined by the determination section 20*b* is associated with the identification information of a device related to the transmission timing or the reception timing. Then, information indicating the transmission timing and information indicating the reception timing are transmitted to each of the devices. When the information indicating the transmission/reception timing is sent to each of the devices, the following processing is carried out at the device.

The following processing is carried out at the MP low-order switching device 31. The second control section 103 obtains the transmission timing information and the reception timing information sent from the MP high-order switching device 20. When the communication terminal side communication section 100 receives packet data, which is sent from the communication terminal device 10 to the mobile terminal 50, from the MP high-order switching device 20, the second control section 103 instructs the communication terminal side communication section 100 to receive the data at the reception timing determined by the determination section 20*b*.

When the mobile terminal side communication section 102 transmits the packet data, sent from the communication terminal device 10 to the mobile terminal 50, to the plurality of base stations 42, 43 by multicast transmission, the second control section 103 instructs the mobile terminal side communication section 102 to transmit the data at the transmission timing determined by the determination section 20*b*.

The following processing is carried out at each of the base stations 42, 43 and 44. The control section 112 acquires the transmission timing information and the reception timing information sent from the MP high-order switching device 20. When the communication terminal side communication section 110 receives packet data sent from the communication terminal device 10 to the mobile terminal 50, the control section 112 instructs the communication terminal side communication section 110 to receive the data at the reception timing determined by the determination section 20*b*.

Moreover, when the mobile terminal side communication section 111 transmits the radio slot data contained in the packet data, sent from the communication terminal device 10 to the mobile terminal 50, to the mobile terminal 50, the control section 112 instructs the mobile terminal side communication section 111 to transmit the data at the transmission timing determined by the determination section 20*b*.

The following processing is carried out at the mobile terminal 50. The mobile terminal 50 acquires the reception timing information sent from the MP high-order switching device 20. When the communication section 50*a* receives radio slot data sent from each of the base stations 42, 43 and 44, the control section 50*b* instructs the communication section 50*a* to receive the data at the reception timing determined by the determination section 20*b*.

Incidentally, the transmission timing information of the MP high-order switching device 20 is sent to the second control section 20*f* of the MP high-order switching device 20. When the mobile terminal side communication section 20*d* transmits the data, sent from the communication terminal device 10 to the mobile terminal 50, to a plurality of devices by multicast transmission, the second control section 20*f* instructs the mobile terminal side communication section 20*d* to transmit the data at the transmission timing determined by the determination section 20*b*.

Next, description will be made of a data transmission method from the communication terminal side 10 to the mobile terminal 50. First, transmission target packet data sent from the communication terminal device 10 is sent to the MP high-order switching device 20 through, e.g., a public network. In this event, each relaying device arranged in the public network carries out a routing processing based on a routing table to transmit the transmission target packet data to the MP high-order switching device 20.

Figure 12:
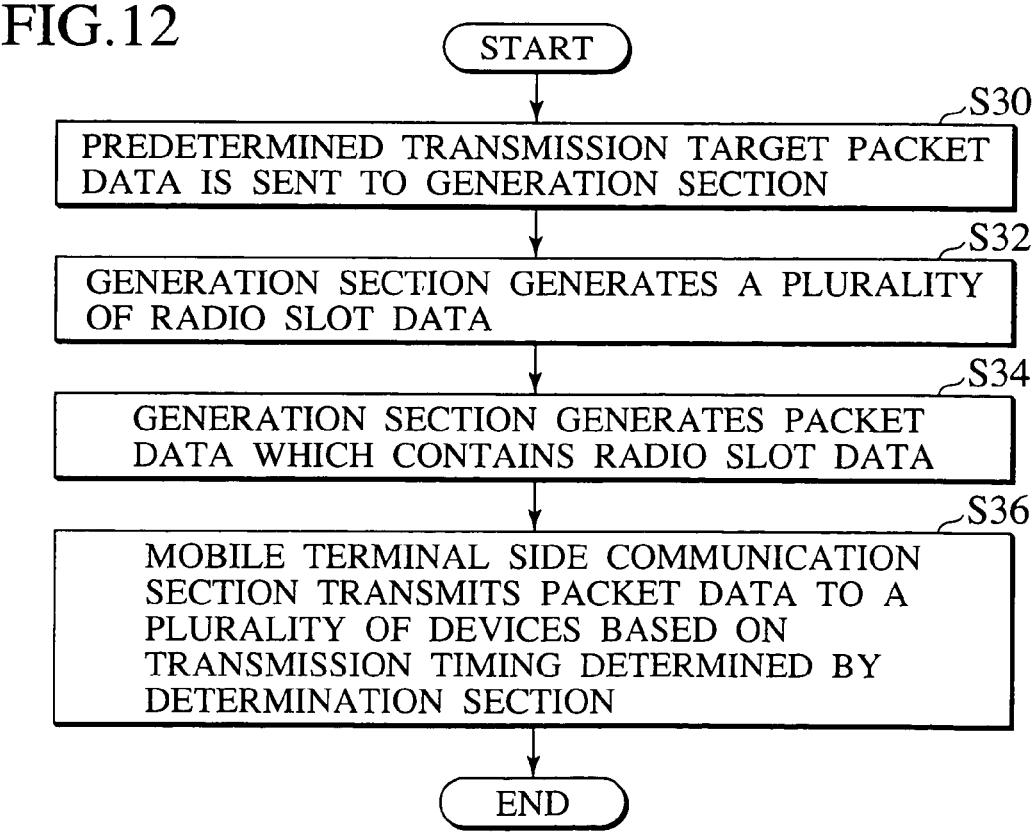
FIG. 12 is a flowchart partially explaining the communication method of the embodiment.

FIG. 12 is a flowchart explaining a processing in the MP high-order switching device 20.

Predetermined transmission target packet data is transmitted from the communication terminal device 10 to the communication terminal side communication section 20a. The predetermined transmission target packet data is sent through the second control section 20f to the generation section 20c (S30). In this event, the number of devices of destinations for multicast transmission by the MP high-order switching device 20 is sent to the generation section 20c.

The generation section 20c generates a plurality of radio slot data based on the transmission target packet data and the number of devices of destinations for multicast transmission by the MP high-order switching device 20 (S32). The generation section 20c generates each packet data which contains radio slot data (S34). Each packet data generated by the generation section 20c is sent to the second control section 20f. The second control section 20f sends the packet data to the mobile terminal side communication section 20d.

The mobile terminal side communication section 20d carries out the following processing based on header information of each packet data and the retained transmission timing information. The mobile terminal side communication section 20d transmits each packet data generated by the generation section 20c to the plurality of devices (MP low-order switching device 31 and base station 44) connected to the MP high-order switching device 20 based on the transmission timing determined by the determination section 20b corresponding to the MP high-order switching device 20 (S36).

Figure 13:
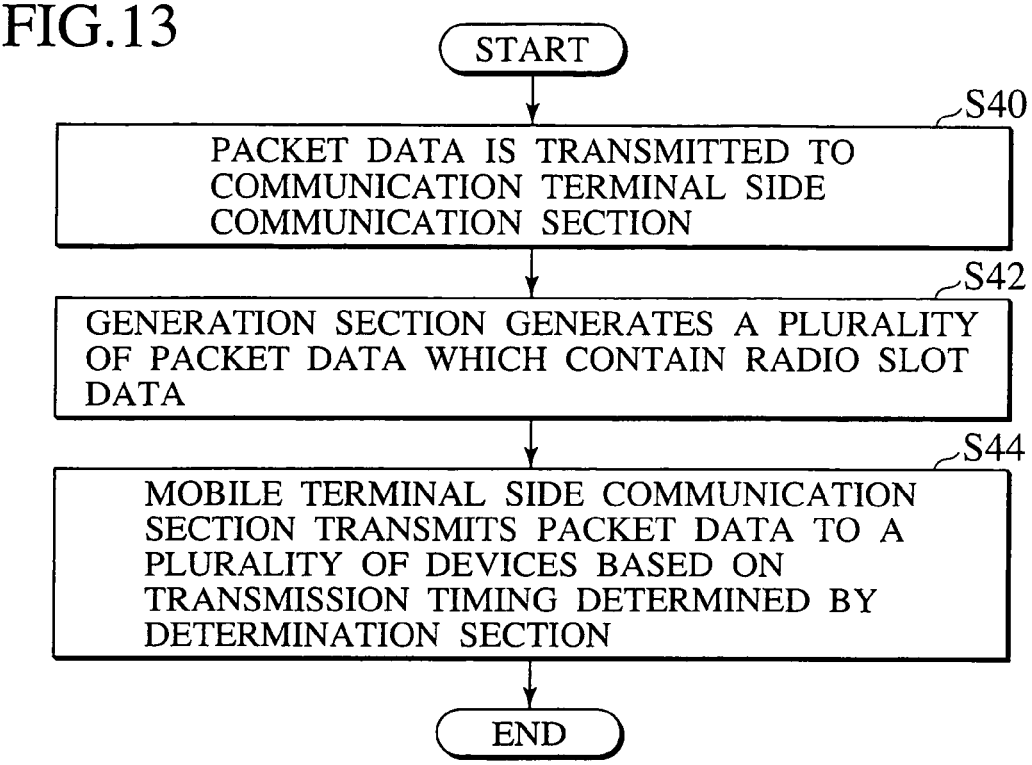
FIG. 13 is a flowchart partially explaining the communication method of the embodiment.

The MP low-order switching device 31 to which the packet data has been transmitted carries out the following processing. FIG. 13 is a flowchart explaining a processing in the MP low-order switching device 31.

Each packet data (e.g., packet data corresponding to transmission sequence information 1 to 4) is transmitted from the MP high-order switching device 20 to the communication terminal side communication section 100. Each of the packet data is sent through the second control section 103 to the generation section 101 (S40). In this event, the number of devices of destinations for multicast transmission by the MP low-order switching device 31 is sent to the generation section 101.

The generation section 101 generates a plurality of packet data which contain radio slot data based on each of the packet data transmitted to the MP low-order switching device 31, and the number of devices of destinations for multicast transmission by the MP low-order switching device 31 (S42). In this event, the generation section 101 carries out a processing of converting header information of each packet data. The specific processing is as described above. The generation section 101 sends each converted packet data to the second control section 103. The second control section 103 sends the packet data to the mobile terminal side communication section 102.

The mobile terminal side communication section 102 carries out the following processing based on header information of each packet data and the retained transmission timing information. The mobile terminal side communication section 102 transmits each packet data generated by the generation section 101 to a plurality of devices (base stations 42, 43) connected to the MP low-order switching device 31 based on the transmission timing determined by the determination section 20b corresponding to the MP low-order switching device 31 (S44).

Figure 14:
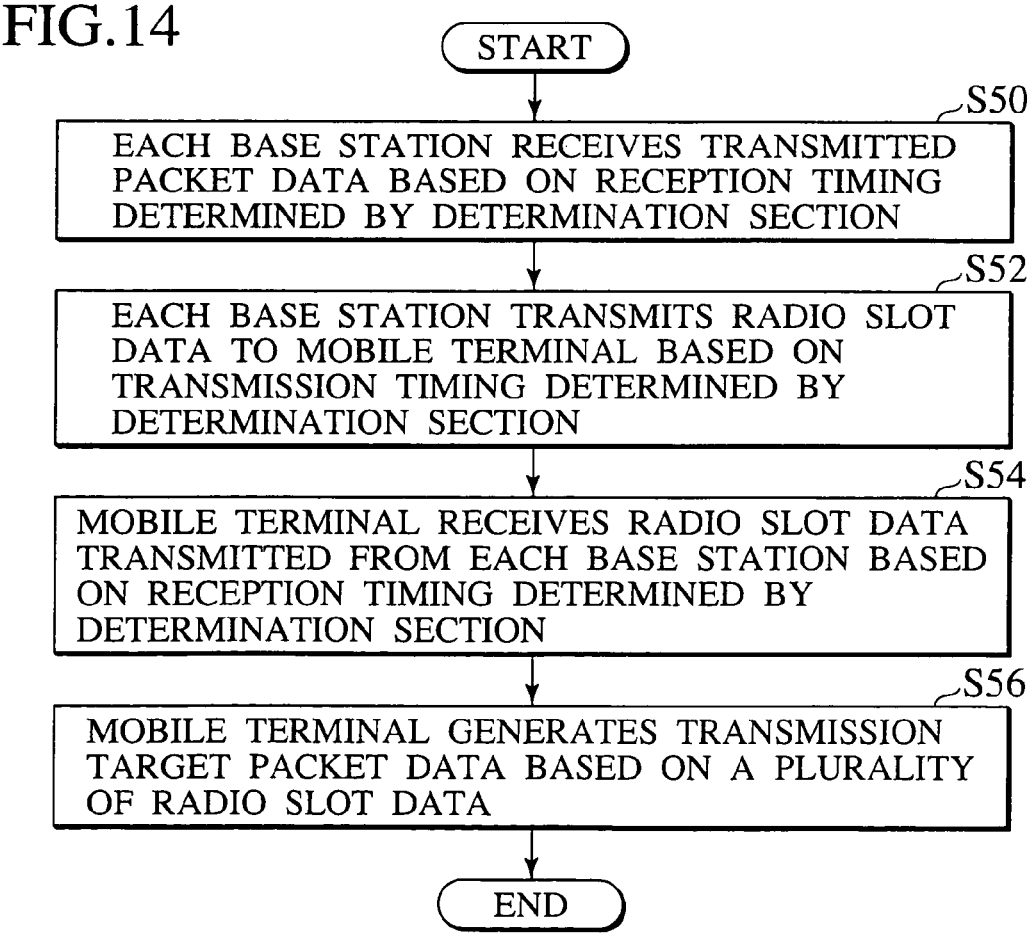
FIG. 14 is a flowchart partially explaining the communication method of the embodiment.

The following processing is carried out at each base station to which each packet data has been transmitted and at the mobile terminal 50 to which each radio slot data has been transmitted. FIG. 14 is a flowchart explaining the process.

The communication terminal side communication section 110 of each of the base stations 42, 43 and 44 receives transmitted packet data based on the reception timing determined by the determination section 20b (S50). Additionally, the mobile terminal side communication section 111 transmits radio slot data to the mobile terminal 50 based on the transmission timing determined by the determination section 20b (S52).

The following processing is carried out at the mobile terminal 50. The communication section 50a of the mobile terminal 50 receives radio slot data transmitted from each of the base stations 42, 43 and 44 based on the reception timing (one simultaneous reception timing) determined by the determination section 20b (S54). Each received radio slot data is sent to the control section 50b. The control section 50b generates the transmission target packet data based on the plurality of radio slot data transmitted from the plurality of base stations 42, 43 and 44 (S56).

(Operation and Effects)

According to the embodiment, for example, in order to set data reception timing of the mobile terminal 50 to be simultaneous among the plurality of base stations 42, 43 and 44, the determination section 20b of the MP high-order switching device 20 can determine timing at which each switching device (switching device which executes multicast transmission) transmits packet data to each of the plurality of devices connected to the switching device. The mobile terminal side communication sections 20d and 102 of each of the switching devices, which executes multicast transmission, can transmit the packet data to the plurality of devices connected to the switching device based on the transmission timing determined by the determination section 20b.

Thus, when the mobile terminal 50 executes radio communication with the plurality of base stations 42, 43 and 44 (in the case of a soft handover state), the plurality of switching devices can carry out a multipath communication processing while data communication between the mobile terminal 50 and the communication terminal device 10 is performed. As a result, since there is no redundant path included in the paths of the data communication between the communication terminal device 10 and the mobile terminal 50, wasteful consumption of network resources is prevented.

Additionally, the data transmitted from the communication terminal device 10 to the mobile terminal 50 is transmitted to each switching device which executes multicast transmission. Each switching device which executes multicast transmission can transmit the packet data to the plurality of devices connected to the switching device based on the transmission timing determined by the determination section 20b. Thus, even when each of the plurality of switching devices executes multicast transmission, the mobile terminal 50 can receive data transmitted from the base stations 42, 43 and 44 at simultaneous timing (handover processing can be realized).

Thus, according to the embodiment, in the data communication between the mobile terminal 50 and the communication terminal device 10, when the mobile terminal 50 executes radio communication with the plurality of base stations 41, 42, . . . , wasteful consumption of network resources is prevented, and data reception timing of the mobile terminal 50 is set simultaneous among the base stations.

In order to achieve the foregoing effects, specifically, each switching device which executes multicast transmission must carry out a corresponding processing (processing regarding handover control). In the embodiment, as an example, each switching device which executes multicast transmission carries out the following processing.

According to the embodiment, the MP high-order switching device 20, among the plurality of switching devices which execute multicast transmission, carries out the following processing. The MP high-order switching device 20 generates a plurality of radio slot data based on the transmission target packet data sent from the communication terminal device 10 and the number of devices of destinations for multicast transmission by the MP high-order switching device 20. Additionally, the MP high-order, switching device 20 generates each packet data which contains radio slot data. The MP high-order switching device 20 transmits the generated packet data to each of the plurality of devices connected to the MP high-order switching device 20 based on the transmission timing determined by the determination section 20b and corresponding to the MP high-order switching device 20.

According to the embodiment, among the plurality of switching devices which execute multicast transmission, the MP low-order switching device 31 generates a plurality of packet data which contain radio slot data based on each transmitted packet data and the number of devices of destinations for multicast transmission by the MP low-order switching device 31. Then, the MP low-order switching device 31 transmits the generated packet data to each of the plurality of devices connected to the MP low-order switching device 31 based on the transmission timing determined by the determination section 20b and corresponding to the MP low-order switching device 31.

Therefore, each of the switching devices which execute multicast transmission, carries out corresponding processing to provide the following effects. That is, when the plurality of base stations 42, 43 and 44 transmit radio slot data contained in the packet data to the mobile terminal 50, the mobile terminal 50 can receive the data transmitted from each of the base stations at simultaneous timing. Moreover, the mobile terminal 50 can generate transmission target packet data based on the plurality of radio slot data transmitted from the base stations 42, 43 and 44.

As a result, in the data communication between the mobile terminal 50 and the communication terminal device 10, when the mobile terminal 50 executes radio communication with the plurality of base stations, wasteful consumption of network resources is prevented, and timing at which the mobile terminal 50 receives data is set simultaneous among the base stations.

MODIFIED EXAMPLE 1

The foregoing embodiment can be modified as follows. Incidentally, in this modified example, description of similar components and functions to those of the embodiment will be omitted. The same components as those of the embodiment are denoted by the same reference numerals. Description will be given, as an example, of a case where, as shown in FIG. 3, in data transmission from the communication terminal device 10 to the mobile terminal 50, the communication system includes one MP high-order switching device 20, one MP low-order switching device 31, the low-order switching device 31 which executes no multicast transmission, the plurality of base stations 42, 43 and 44, and the mobile terminal 50 which executes radio communication with the plurality of base stations 42, 43 and 44.

If there is a difference between at least one timing, among timing at which packet data was received at each of the plurality of base stations 42, 43, 44 and timing at which packet data was received at the MP low-order switching device 31 (each of one or a plurality of second switching devices), and reception timing determined by the determination section 20b corresponding to the one timing, at least one control section, among the control section 112 of each of the base stations 42, 43 and 44 and the second control section 103 of the MP low-order switching device 31 generates difference information indicating the difference.

The control sections 112 of each of the base stations 42, 43 and 44 and the second control section 103 of the MP low-order switching device 31 compare timing at which the communication terminal side communication section receives each packet data with the reception timing of the each packet data, determined by the determination section 20b, respectively, thereby determining whether there is a difference or not.

Specifically, the processing is as follows. For example, information, which indicates reception timing Y1 of packet data from the communication terminal device 10 to the mobile terminal 50, is sent to the control sections 112 of each of the base stations 42, 43 and 44. Information, which indicates reception timing Y2 of the packet data from the communication terminal device 10 to the mobile terminal 50, is sent to the second control section 103 of the MP low-order switching device 31. The reception timing Y1 is represented by, e.g., y1+nT (y1 is predetermined hour timing, n is an integer, and T is a cycle). The reception timing Y2 is represented by, e.g., y2+nT (y2 is predetermined hour timing, n is an integer, and T is a cycle). Here, T of Y1 is an equal value to T of Y2. Additionally, n is a value corresponding to transmission target information.

When the communication terminal side communication sections receive one piece of packet data (packet data from the communication terminal device 10 to the mobile terminal 50), the control sections 112 of each of the base stations 42, 43 and 44 and the second control section 103 of the MP low-order switching device 31 acquire transmission sequence information contained in the packet data, and reception time when the communication terminal side communication section received the packet data, respectively. The control sections 112 of each of the base stations 42, 43 and 44 and the second control section 103 of the MP low-order switching device 31 then compare reception timing (reception timing of packet data from the communication terminal device 10 to the mobile terminal 50) corresponding to the acquired transmission sequence information with the acquired reception timing, respectively, thereby determining whether there is a difference or not.

If there is a difference, the control section 112 (difference information generation section) of each of the base stations 42, 43 and 44, and the second control section 103 (difference information generation section) of the MP low-order switching device 31 generate difference information indicating the difference, respectively.

The control section 112 of each of the base stations 42, 43 and 44 transmits the difference information through the communication terminal side communication sections 110 to a predetermined switching device (e.g., MP low-order switching device 31) connected to the base station at the communication terminal device 10 side. In this case, identification information of the each base station is provided to the difference information.

The second control section 103 of the MP low-order switching device 31 transmits the difference information through the communication terminal side communication section 100 to a predetermined switching device (e.g., MP high-order switching device 20) connected to the MP low-order switching device 31 at the communication terminal device 10 side. In this case, identification information of the MP low-order switching device 31 is provided to the difference information.

Upon acquisition of the difference information, the second control section of the predetermined switching device (MP high-order switching device 20 or MP low-order switching device 31) acquires the identification information of a predetermined device (MP low-order switching device 31 or base station) associated with the difference information.

When the second control section of the predetermined switching device has acquired the difference information from the predetermined device, the communication terminal side communication section of the predetermined switching device transmits, based on the difference information, packet data to the predetermined device at predetermined transmission timing for the predetermined device to receive the packet data at reception timing which has been determined by the determination section 20b. Specifically, the second control section (e.g. the second control section 20f, 103) of the predetermined switching device instructs the communication terminal side communication section (e.g. communication terminal side communication section 20d, 102) to transmit the packet data to the predetermined device at predetermined transmission timing (transmission timing of packet data from the communication terminal device 10 to the mobile terminal 50) for the predetermined device to receive the packet data at reception timing (reception timing of packet data from the communication terminal device 10 to the mobile terminal 50) which has been determined by the determination section 20b. The communication terminal side communication section transmits the packet data to the predetermined device at the predetermined transmission timing.

The specific processing is as follows. For example, it is assumed that the difference information is time p (timing at which data is actually received is later by time p than the reception timing determined by the determination section 20b), and that the identification information of the device associated with the difference information is identification information of the base station 42.

In this case, the predetermined switching device is the MP low-order switching device 31, and the predetermined device is the base station 42. The second control section 103 of the MP low-order switching device 31 is assumed to hold information indicating that timing for transmitting packet data (packet data from the communication terminal device 10 to the mobile terminal 50) to the base station 42 is w3 (=y3+nT).

In this case, the second control section 103 of the MP low-order switching device 31 calculates, e.g., (y3−p)+nT as predetermined transmission timing (transmission timing of packet data from the communication terminal device 10 to the mobile terminal 50) for the base station 42 to receive the packet data at the reception timing (reception timing of packet data from the communication terminal device 10 to the mobile terminal 50) which has been determined by the determination section 20b.

Subsequently, the second control section 103 of the MP low-order switching device 31 instructs the mobile terminal side communication section 102 to transmit the packet data to the base station 42 at the calculated predetermined transmission timing. Accordingly, the base station 42 can receive the packet data earlier by the time p. Thus, the base station 42 can receive the packet data at the reception timing determined by the determination section 20b.

According to this modified example, the following operation and effects can be obtained. In the data transmission from the communication terminal device 10 to the mobile terminal 50, with a lapse of time, a change may occur in a throughput at each device or in a transmission load in each communication path. Therefore, the base station, which executes radio communication with the mobile terminal 50, or the MP low-order switching device may not be able to receive the packet data at the reception timing determined by the determination section 20b.

In this modified example, the predetermined device (base station, which executes radio communication with the mobile terminal 50, or MP low-order switching device) can generate difference information indicating a difference between the timing at which the packet data is actually received and the reception timing determined by the determination section 20b. The generated difference information is then transmitted to the predetermined switching device (MP low-order switching device 31 or MP high-order switching device 20) connected to the predetermined device (base station or MP low-order switching device 31) at the communication terminal device side.

The predetermined switching device acquires the difference information from the predetermined device. Here, if the predetermined switching device is the MP high-order switching device 20, the predetermined device is the base station 44 or the MP low-order switching device 31. If the predetermined switching device is the MP low-order switching device 31, the predetermined device is the base station 42 or the base station 43. Based on the difference information, the predetermined switching device transmits the packet data to the predetermined device at predetermined transmission timing (predetermined transmission timing for the predetermined device to receive the packet data at reception timing which has been determined by the determination section 20b). Thus, the predetermined device can receive the packet data at the reception timing determined by the determination section 20b.

Therefore, according to this modified example, even if actual reception timing at the base station or the MP low-order switching device is shifted from the reception timing determined by the determination section 20b, the actual reception timing is quickly returned to the reception timing determined by the determination section 20b.

MODIFIED EXAMPLE 2

The foregoing modified example 1 may be further modified as follows if the predetermined switching device is the MP low-order switching device. This modified example will be described, as an example, in a case where the predetermined device is the base station 42, and the predetermined switching device is the MP low-order switching device 31.

When the mobile terminal side communication section 102 of the predetermined switching device (MP low-order switching device 31) cannot transmit packet data to the predetermined device (e.g., base station 42) at the above-described predetermined transmission timing, the mobile terminal side communication section 102 transmits transmission impossibility information to a terminal side switching device (e.g., MP high-order switching device 20) connected to the predetermined switching device at the communication terminal device 10 side.

A specific example of this processing is as follows. For example, if the predetermined transmission timing is earlier than predetermined timing which indicates a time point when packet data processing time (packet data processing time of the MP low-order switching device 31) elapses from the reception timing at the MP low-order switching device 31 (reception timing determined by the determination section 20b), the mobile terminal side communication section 102 of the MP low-order switching device 31 cannot transmit the packet data to the base station 42 at the predetermined transmission timing.

In this case, the second control section 103 of the MP low-order switching device 31 generates transmission impossibility information indicating that the packet data cannot be transmitted at the predetermined transmission timing. This transmission impossibility information contains difference information indicating a difference between the predetermined timing and the predetermined transmission timing. Moreover, identification information of the MP low-order switching device 31 is provided to the transmission impossibility information. Based on an instruction from the second control section 103 of the MP low-order switching device 31, the communication terminal side communication section 100 transmits the transmission impossibility information to the MP high-order switching device 20 (terminal side switching device).

Based on the transmission impossibility information, the mobile terminal side communication section 20d of the MP high-order switching device 20 (terminal side switching device) carries out the following processing. The mobile terminal side communication section 20d transmits the packet data to the predetermined switching device (MP low-order switching device 31) at transmission timing (transmission timing of packet data from the communication terminal device 10 to the mobile terminal 50) for the mobile terminal side communication section 102 to transmit the packet data to the predetermined device (base station 42) at predetermined transmission timing (predetermined transmission timing calculated in )"Modified Example 1")

The specific processing is as follows. For example, it is assumed that the difference information contained in the transmission impossibility information is time q, the identification information of the predetermined switching device associated with the transmission impossibility information is identification information of the MP low-order switching device 31, the predetermined switching device is the base station 42., and the terminal side switching device is the MP high-order switching device 20. The second control section 20f of the MP high-order switching device 20 is assumed to hold information indicating that timing (transmission timing of packet data from the communication terminal device 10 to the mobile terminal 50) for transmitting packet data to the MP low-order switching device 31 is w1 (=y1+nT).

In this case, the second control section 20f of the MP high-order switching device 20 carries out the following processing based on the held transmission timing information and the difference information. That is, the second control section 20f calculates (y1−q)+nT as transmission timing for the mobile terminal side communication section 102 of the MP low-order switching device 31 to transmit the packet data to the base station 42 at the predetermined transmission timing (timing calculated in "Modified Example 1").

Subsequently, the second control section 20f of the MP high-order switching device 20 instructs the mobile terminal side communication section 20d to transmit the packet data to the MP low-order switching device 31 at the calculated transmission timing. Accordingly, the MP low-order switching device 31 can receive the packet data earlier by the time q, and transmit the packet data to the base station 42 by the predetermined transmission timing (timing calculated in Modified Example 1).

According to this modified example, the following operation and effects can be obtained. The predetermined MP low-order switching device 31 which has obtained the difference information may not be able to transmit the packet data to the predetermined device (e.g., base station 42) at the predetermined transmission timing (timing calculated in Modified Example 1). In this case, the MP low-order switching device 31 transmits transmission impossibility information to the terminal side switching device (e.g., MP high-order switching device 20) which is an MP switching device connected to the MP low-order switching device 31 at the communication terminal device 10 side.

Based on the transmission impossibility information, the MP high-order switching device 20 (terminal side switching device) can transmit the packet data to the MP low-order switching device 31 at certain transmission timing (transmission timing for the MP low-order switching device 31 to transmit the packet data to the predetermined device (base station 42) at the predetermined transmission timing (timing calculated in Modified Example 1)).

As a result, the predetermined switching device (MP low-order switching device 31) can transmit the packet data to the predetermined device (e.g., base station 42) at the predetermined transmission timing (timing calculated in Modified Example 1). Thus, the predetermined device (e.g., base station 42) can receive the packet data at the reception timing determined by the determination section 20b.

Therefore, according to this modified example, even if actual reception timing at the base station or the MP low-order switching device is shifted from the reception timing determined by the determination section 20b, the actual reception timing is more surely recovered to the reception timing determined by the determination section 20b than in the modified example 1.

MODIFIED EXAMPLE 3

The foregoing embodiment may be modified also as follows. According to this modified example, the mobile terminal 50 can transmit data to the communication terminal device 10 through the plurality of base stations 42, 43 and 44. That is, according to the communication system of this modified example, when the mobile terminal 50 transmits packet data to the communication terminal device 10 through the plurality of base stations 42, 43 and 44, each of the plurality of switching devices (e.g., MP low-order switching device 31, MP high-order switching device 20) included in the communication paths between the communication terminal device 10 and the plurality of base stations 41, 42, . . . , receives the packet data from the plurality of devices (e.g., base stations 42, 43 and 44, MP low-order switching device 31) connected to the switching device.

Note that, in this modified example, switching devices which execute multicast transmission have already been determined among the switching devices. Moreover, communication information has already been transmitted to each switching device. Here, the switching device (MP high-order switching device 20, MP low-order switching device 31) that executes multicast transmission, which was described in the embodiment, receives packet data from each of the plurality of devices connected to the switching device at the mobile terminal 50 side, and directly transmits the packet data to the device connected to the switching device at the communication terminal device 10 side.

In this modified example, description of similar components and functions to those of the embodiment will be omitted. The same components as those of the embodiment are denoted by the same reference numerals. In this modified example, a description will be give, as an example, of a case where in data transmission from the mobile terminal 50 to the communication terminal device 10, the communication system includes one MP high-order switching device 20, one MP low-order switching device 31, one UP low-order switching device 32, the plurality of base stations 41, 42, . . . , and the mobile terminal 50 which executes radio communication with the plurality of base stations 42, 43 and 44.

In this modified example, a function of the control section 50b of the mobile terminal 50, a function of the control section 112 of the base station, a function of the communication terminal side communication section 110 of the base station, a function of the second control section 103 of the MP low-order switching device 31, a function of the communication terminal side communication section 100 of the MP low-order switching device 31, a function of the second control section 20f of the MP high-order switching device 20, and a function of the communication terminal side communication section 20a of the MP high-order switching device 20 are different from those of the embodiment as follows.

Incidentally, in this modified example, a description will be given, as an example, of a case where one low-order switching device is included in the communication paths between the high-order switching device and the base station.

Figure 15:
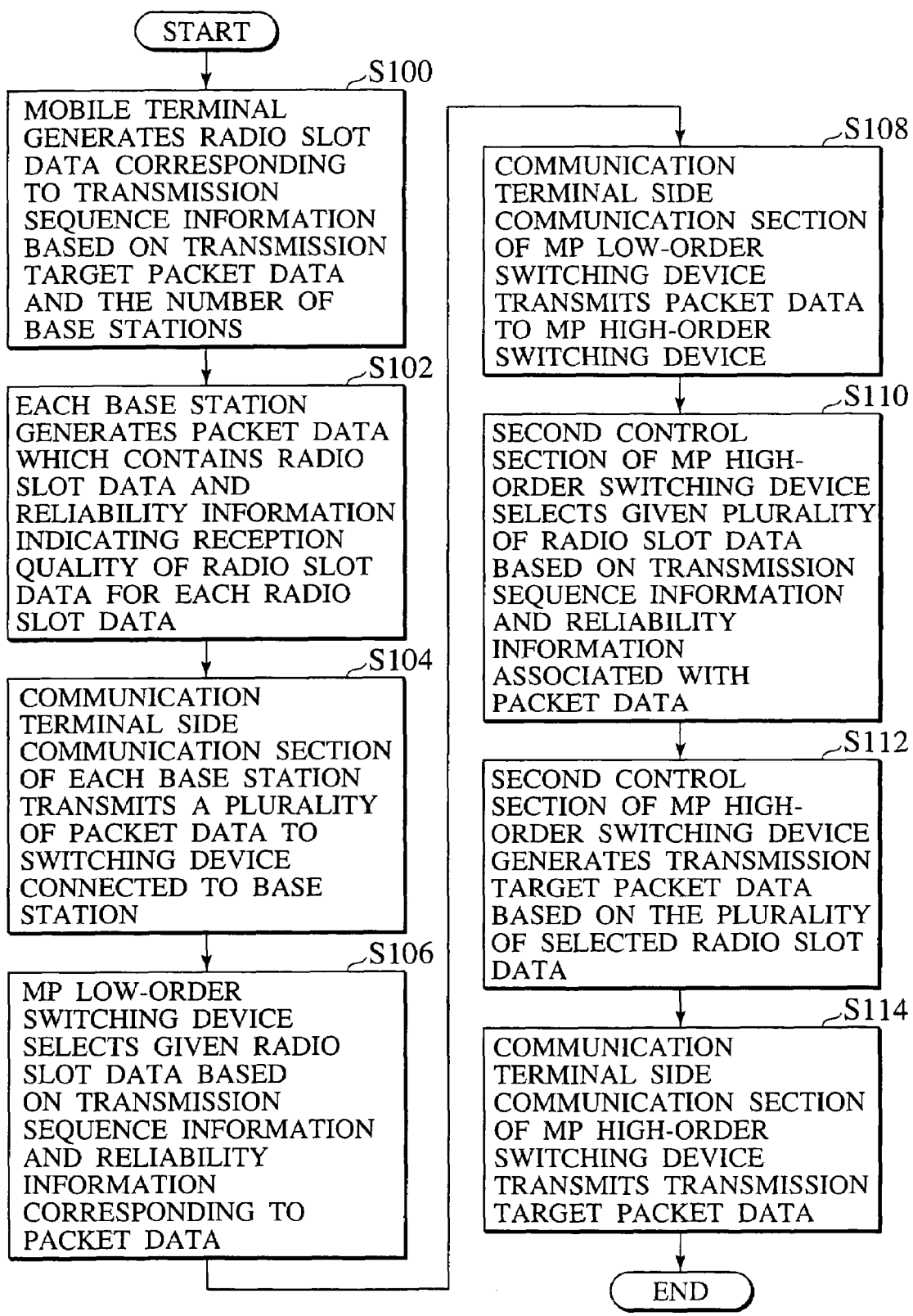
FIG. 15 is a flowchart explaining an operation of a communication system of Modified Example 3.

Hereinafter, a description will be given of a communication method (operation of the communication system) using the communication system of this modified example. FIG. 15 is a flowchart for explaining the communication method of this modified example.

Based on transmission target packet data which is packet data to be transmitted to the communication terminal device 10, and on the number of base stations 42, 43 and 44 (e.g., three), the control section 50b (radio slot generation section) of the mobile terminal 50 generates each radio slot data while associating the radio slot data with transmission sequence information indicating the sequence of transmission (S100).

The specific processing is as follows. The control section 50b of the mobile terminal 50 holds identification information of the base stations 42, 43 and 44 with which the mobile terminal 50 executes radio communication, and the number of the base stations. The control section 50b divides the transmission target packet data into a predetermined number of pieces, thereby generating the predetermined number of radio slot data. In this event, the control section 50b provides transmission sequence information indicating the sequence of transmission to each generated radio slot data. The control section 50b then generates as many a set of the predetermined number of radio slot data as the number of base stations 42, 43 and 44.

For example, if the number of base stations is three, and the predetermined number is four, the control section 50b generates four radio slot data from the transmission target packet data. Transmission sequence information (1, 2, 3, 4) is provided to each radio slot data. The control section 50b then copies the four generated radio slot data.

The control section 50b transmits the predetermined number of generated radio slot data each of to the base stations 42, 43 and 44 through the communication section 50a. In this event, address information (identification information of the communication terminal device 10) and information for specifying the mobile terminal 50 which is a transmission source device are provided to each radio slot data.

The following processing is carried out at each of the base stations 42, 43 and 44. Upon acquisition of the predetermined number of radio slot data, the control section 50b of each of the base stations 42, 43 and 44 generates packet data which contains the radio slot data and reliability information indicating reception quality of the radio slot data for each radio slot data (S102).

The specific processing is as follows. The control section 112 of each of the base stations 42, 43 and 44 monitors reception quality (e.g., presence of bit errors, reception SIR or the like) of the radio slot data sent from the mobile terminal side communication section 111 for each radio slot data. The control section 112 of each of the base stations 42, 43 and 44 generates reliability information corresponding to the monitored reception quality for each radio slot data. The control section 112 generates packet data which contains radio slot data and reliability information corresponding to the radio slot data for each radio slot data.

In this event, each packet data contains the identification information of a destination device (switching device), the information indicating that data transmission is from the mobile terminal 50 to the communication terminal device 10, the identification information of the communication terminal device 10, and the information for specifying the mobile terminal 50. Each packet data is sent to the communication terminal side communication section 110.

The communication terminal side communication section 110 of each of the base stations 42, 43 and 44 transmits a plurality of packet data generated by the control section (packet generation section) 112 to the switching device connected to the base station (S104).

That is, the control section 112 of each of the base stations 42, 43 sends the predetermined number of packet data to the MP low-order switching device 31. The control section 112 of the base station 44 sends the predetermined number of packet data to the MP high-order switching device 20 through the low-order switching device 32.

When a plurality of pieces of packet data are transmitted from the plurality of devices (base stations 42, 43) connected to the MP low-order switching device 31 (second switching device described in the embodiment) to the MP low-order switching device 31, the second control section 103 of the MP low-order switching device 31 selects given radio slot data from among a plurality of pieces of radio slot data contained in the plurality of pieces of packet data, based on the transmission sequence information and the reliability information associated with each of the plurality of pieces of packet data (S106).

Figure 16:
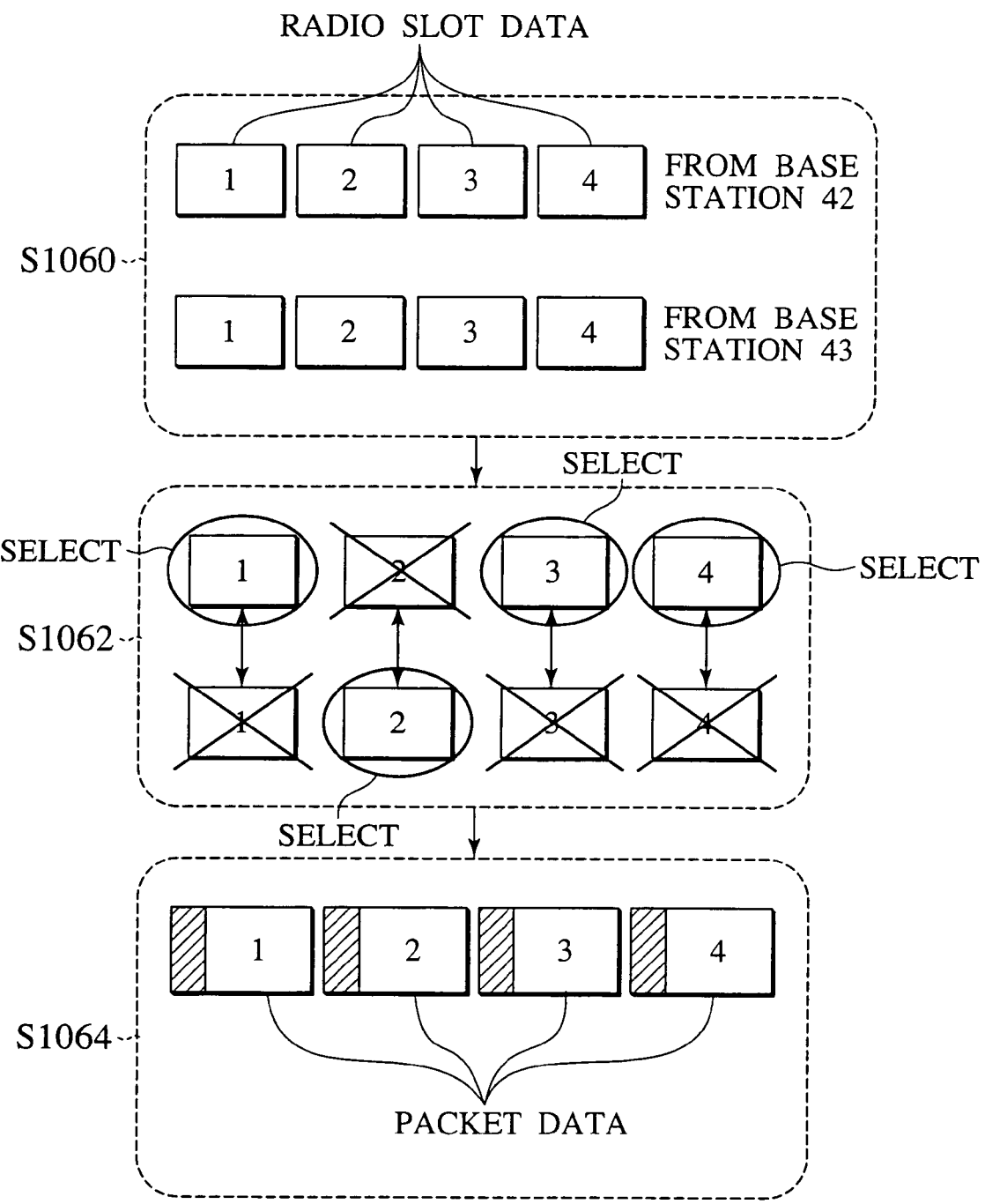
FIG. 16 is a supplemental view explaining a processing in an MP low-order switching device of the Modified Example 3.

For example, the specific processing is as follows. FIG. 16 is a supplemental view for explaining processing in the MP low-order switching device 31. The predetermined number of packet data is sent from the base stations 42, 43 to the second control section 103 of the MP low-order switching device 31 (S1060).

The second control section 103 acquires the radio slot data contained in each packet data. The second control section 103 carries out the following processing for each transmission sequence information. The second control section 103 compares reliability information associated with two radio slot data corresponding to the same transmission sequence information and selects the radio slot data with higher reliability information (S1062).

Upon selection of the radio slot data corresponding to all the pieces of transmission sequence information (1 to 4), the second control section 103 generates packet data which contains the selected radio slot data and reliability information associated with the radio slot data for each selected radio slot data (S1064). In this event, each packet data contains the identification information of the destination device (MP high-order switching device 20), the information indicating that the data transmission is from the mobile terminal 50 to the communication terminal device 10, the identification information of the communication terminal device 10, and the information for specifying the mobile terminal 50.

The second control section 103 instructs the communication terminal side communication section 100 to transmit each packet data to the MP high-order switching device 20. The communication terminal side communication section 100 transmits the packet data each of which contains radio slot data selected by the second control section 103 to the MP high-order switching device 20 (switching device connected to the second switching device) (S108).

When a plurality of pieces of packet data are transmitted from the plurality of devices (MP low-order switching device 32, base station 44) connected to the MP high-order switching device 20 to the MP high-order switching device 20 (first switching device), the second control section 20f of the MP high-order switching device 20 carries out the following processing. The second control section 20f selects given plurality of pieces of radio slot data from among a plurality of pieces of radio slot data contained in the plurality of pieces of packet data, based on the transmission sequence information and the reliability information associated with each of the plurality of pieces of packet data (S110).

Figure 17:
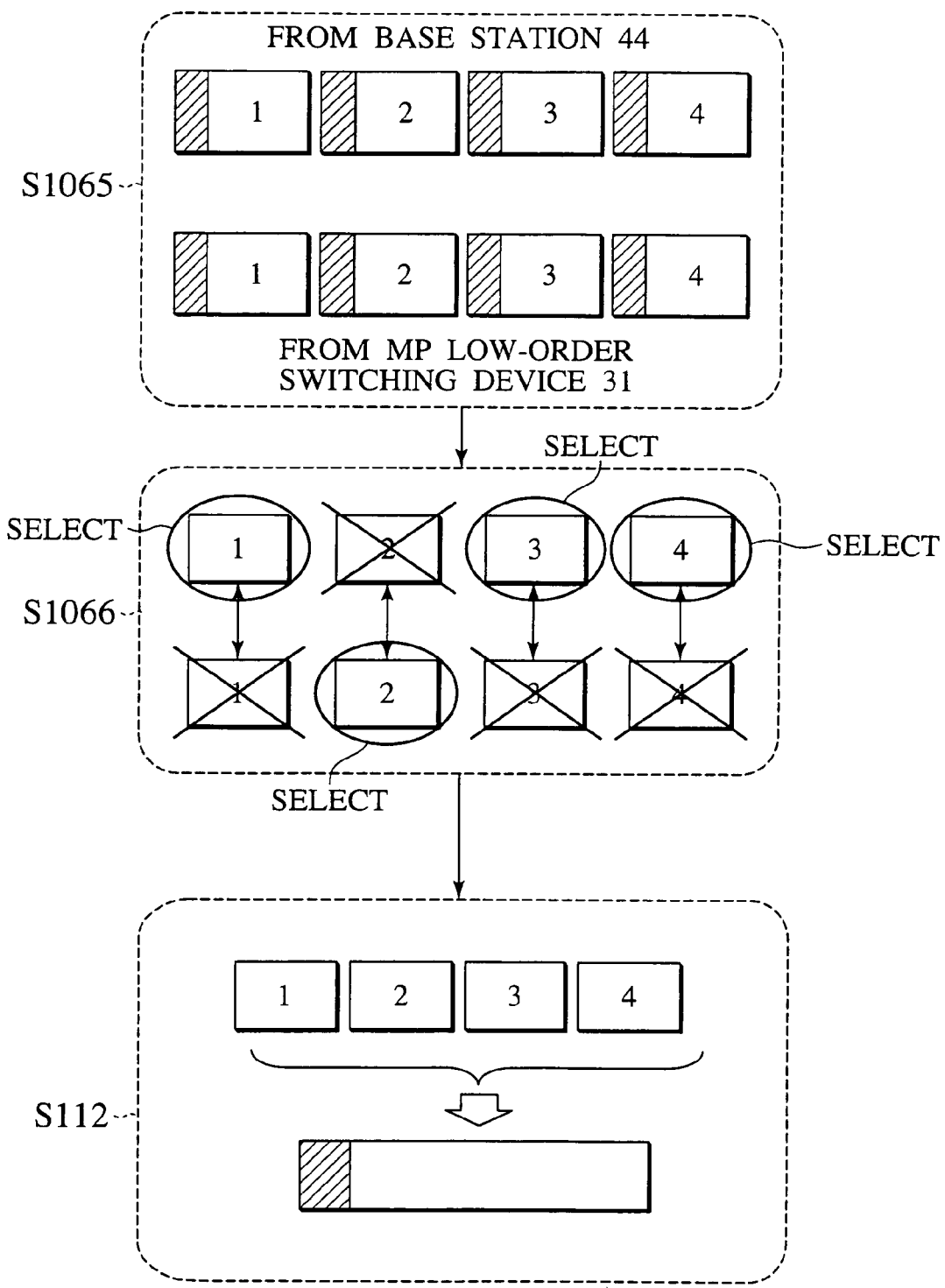
FIG. 17 is a supplemental view explaining a processing in an MP high-order switching device of the Modified Example 3.

FIG. 17 is a supplemental view for explaining processing in the MP high-order switching device 20. In FIG. 17, in steps S1065 and S1066, processes corresponding to those of steps S1060 and S1062 are carried out, respectively. When the second control section 20f has selected radio slot data corresponding to all the pieces of transmission sequence information, the following processing is carried out.

Based on the selected plurality of pieces of radio slot data, the second control section 20f generates transmission target packet data (S112). Specifically, the second control section 20f combines the selected radio slot data corresponding to all the pieces of transmission sequence information (e.g., 1 to 4 in FIG. 17), thereby generating transmission target packet data. Subsequently, the second control section 20f instructs the communication terminal side communication section 20a to transmit the transmission target packet data to the communication terminal device 10. Based on the address information (identification information of the communication terminal device 10) contained in the transmission target packet data, the communication terminal side communication section 20a transmits the transmission target packet data to the communication terminal device 10 through, e.g., a public network (S114).

According to this modified example, in the case of data transmission from the mobile terminal 50 to the communication terminal device 10, the following operation and effects can be obtained even if the mobile terminal 50 executes communication with the plurality of base stations 42, 43 and 44. That is, each of the plurality of switching devices (MP high-order switching device 20, MP low-order switching device 31) can directly transmit the packet data, sent from the plurality of devices connected to the switching device at the mobile terminal 50 side, to the device connected to the switching device at the communication terminal device 10 side. For example, the MP low-order switching device 31 can directly transmit the placket data, sent from the plurality of base stations 42, 43, to the MP high-order switching device 20 connected to the MP low-order switching device 31 at the communication terminal device 10 side. Moreover, the MP high-order switching device 20 can directly transmit the packet data, sent from the plurality of devices connected to the MP high-order switching device 20 at the mobile terminal 50 side, to the communication terminal device 10 through a public network.

Thus, according to this modified example, when the mobile terminal 50 executes radio communication with the plurality of base stations 42, 43 and 44 in data transmission from the mobile terminal 50 to the communication terminal device 10, no redundant path is included in the path of data communication between the communication terminal device 10 and the mobile terminal 50. As a result, wasteful consumption of network resources is prevented.

The base stations 42, 43 and 44 generate the packet data which contains the radio slot data and the reliability information indicating reception quality of the radio slot data for each radio slot data. The base stations 42, 43 and 44 transmit the generated plurality of packet data to the MP switching device (MP low-order switching device 31 or MP high-order switching device 20).

Upon acquisition of a plurality of pieces of packet data transmitted, each MP switching device selects, for example, given radio slot data with high reliability information from among a plurality of pieces of radio slot data contained in the plurality of pieces of packet data, based on the transmission sequence information and the reliability information associated with each of the plurality of pieces of packet data. Each MP switching device transmits each packet data, which contains each of the selected radio slot data, to the device (e.g., MP high-order switching device 20) connected to the MP switching device at the communication terminal device 10 side. Accordingly, the MP low-order switching device 31 can generate each slot data of high communication quality and transmit the slot data to the MP high-order switching device 20.

Upon acquisition of a plurality of pieces of packet data transmitted, the MP high-order switching device 20 can carry out the following processing based on the transmission sequence information and the reliability information associated with each of the plurality of pieces of packet data, from among a plurality of pieces of radio slot data contained in the plurality of pieces of packet data. For example, the MP high-order switching device 20 selects given plurality of pieces of radio slot data with high reliability information, and generates transmission target packet data based on the selected plurality of pieces of radio slot data. The transmission target packet data is then sent to the communication terminal device 10.

Thus, according to this modified example, communication quality of data to be obtained by the communication terminal device 10 can be made good when data sent from the mobile terminal 50 is transmitted to the communication terminal device 10.

MODIFIED EXAMPLE 4

The foregoing modified example 3 may be further modified as follows. For example, when each packet data is transmitted from a plurality of devices to the second control section 20f of the MP high-order switching device 20, the second control section 20f acquires each of the packet data. If reliability information of all the radio slot data corresponding to given transmission sequence information is low, for example, the second control section 20f may be adapted to be incapable of selecting the radio slot data corresponding to the given transmission sequence information.

In this case, the MP high-order switching device 20 has the following function. Incidentally, even if the radio slot data corresponding to the given transmission sequence information cannot be sent to the second control section 20f, the MP high-order switching device 20 may have the following function. The control section 50b of the mobile terminal 50 holds the predetermined number of generated radio slot data while associating each piece of the radio slot data with the transmission sequence information. The control section 50b carries out the aforementioned holding process during a period of time when there is a possibility that a retransmission request (described later) will be sent from the MP high-order switching device 20.

If the second control section 20f (second selection section) of the MP high-order switching device 20 selects given plurality of pieces of radio slot data from among a plurality of pieces of radio slot data contained in the plurality of pieces of packet data, but cannot select the radio slot data corresponding to the given transmission target information, the mobile terminal side communication section 20d carries out the following processing. The mobile terminal side communication section 20d transmits a request for radio slot data corresponding to the given transmission target information (this request is a well-known automatic repeat request (ARQ), and referred to as a repeat request hereinafter) to the mobile terminal 50.

Figure 18:
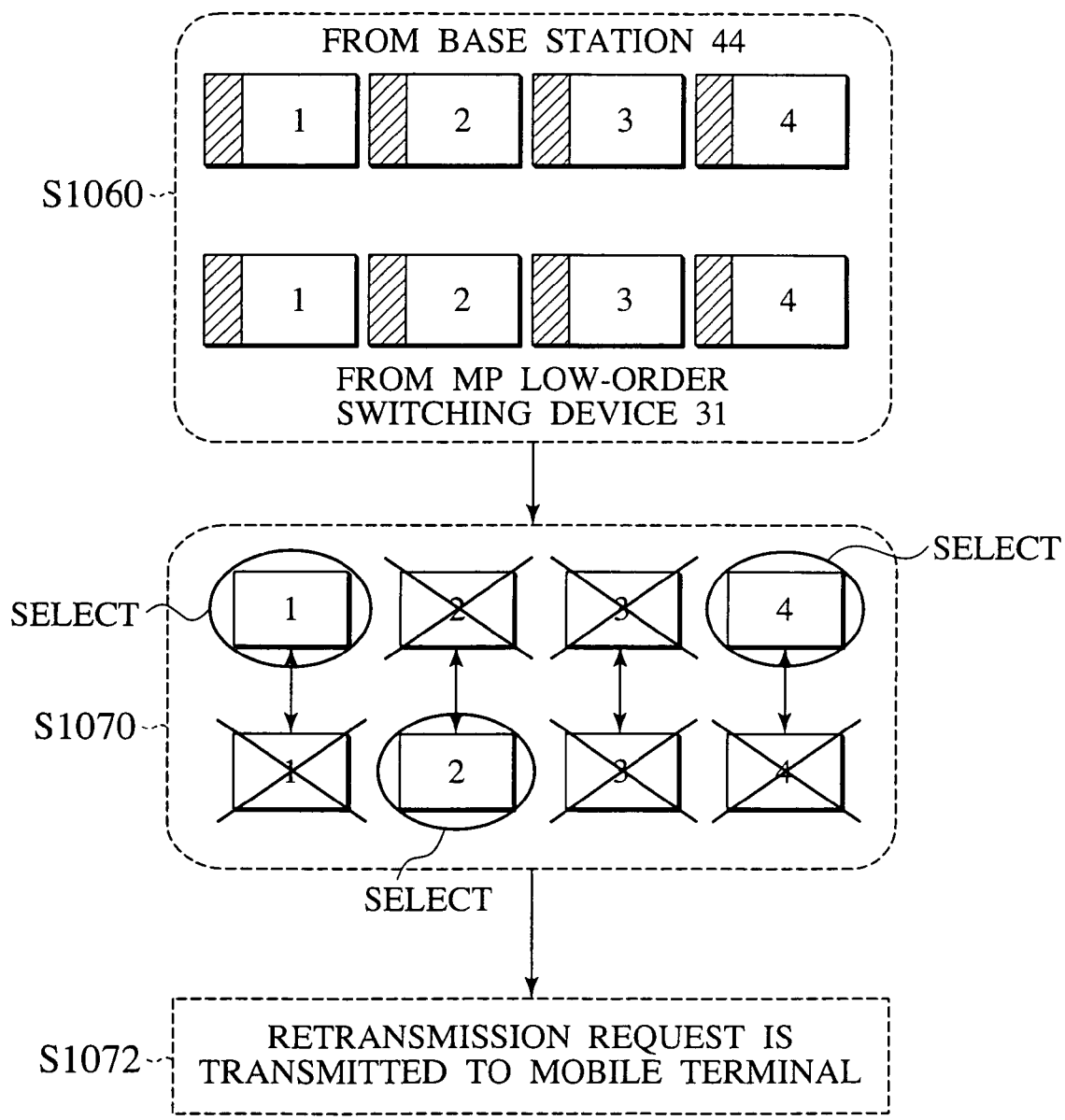
FIG. 18 is a supplemental view explaining a processing in an MP high-order switching device of Modified Example 4.

The specific processing is as follows. FIG. 18 is a supplemental view for explaining the processing in the MP high-order switching device 20 of the modified example. As shown in FIG. 18, it is assumed that packet data (containing radio slot data and reliability information) corresponding to pieces 1 to 4 of the transmission sequence information are sent from two devices (MP low-order switching device 31, base station 44) to the second control section 20f of the MP high-order switching device 20 (S1060).

In this case, for example, it is assumed that reliability information of both pieces of the radio slot data corresponding to the transmission sequence information 3 are low. The second control section 20f selects given one piece of radio slot data corresponding to the transmission sequence information 1, 2, 4, from among both pieces of the radio slot data the transmission sequence information 1, 2, 4 respectively, and holds the data. On the other hand, the second control section 20f determines impossibility of selecting radio slot data corresponding to the transmission sequence information 3 (S1070). The second control section 20f instructs the mobile terminal side communication section 20d to transmit a repeat request of radio slot data corresponding to the given transmission sequence information 3 to the mobile terminal 50 (S1072).

Upon acquisition of the repeat request, the control section 50b of the mobile terminal 50 transmits the held radio slot data corresponding to the given transmission sequence information 3 to the MP high-order switching device 20 through the communication section 50a.

The second control section 20f of the MP high-order switching device 20 acquires the radio slot data, corresponding to the given transmission sequence information 3, which has been sent from the mobile terminal 50. The second control section 20f carries out the following processing based on the acquired radio slot data corresponding to the given transmission sequence information 3 and the held radio slot data (selected radio slot data corresponding to the transmission sequence information 1, 2, 4). That is, the second control section 20f combines each radio slot data (radio slot data corresponding to the transmission sequence information 1, 2, 3 and 4), thereby generating the transmission target packet data. Thereafter, the processing of step S114 in Modified Example 3 is carried out.

According to this modified example, in the case that a plurality of pieces of packet data are transmitted to the MP high-order switching device 20, if all pieces of radio slot data corresponding to the given transmission sequence information are all bad in communication quality, or the packet data corresponding to the given transmission sequence information is not transmitted, the aforementioned repeat request is transmitted to the mobile terminal 50. Based on the repeat request, the mobile terminal 50 transmits packet data corresponding to the given transmission sequence information to the MP high-order switching device 20. Accordingly, the second control section 20f of the MP high-order switching device 20 can generate transmission target packet data, based on the selected plurality of radio slot data and the transmitted radio slot data. Thus, according to this modified example, communication quality of data acquired by the communication terminal device 10 can be made further better than in Modified Example 3.

MODIFIED EXAMPLE 5

The embodiment and the modified examples 1 to 4 may be further modified as follows. Incidentally, description of processes similar to those of the embodiment and the modified examples 1 to 4 will be omitted.

A function of the high-order switching device 20 may be shared by a high-order router (not shown) and a high-order controller (not shown) connected to the high-order router through a line. In this case, the high-order switching device 20 includes the high-order router and the high-order controller. The high-order router includes a mobile terminal side communication section 20d, a first control section 20g, a communication terminal side communication section 20a, and a controller side communication section (not shown) which executes data communication with the high-order controller. The high-order controller includes a communication section (not shown) which executes data communication with the high-order router, a second control section 20f, a generation section 20c, and a determination section 20b.

A function of each of the low-order switching devices 31, 32 may be shared by a low-order router (not shown) and a low-order controller (not shown) connected to the low-order router through a line. In this case, each of the low-order switching devices 31, 33 includes the low-order router and the low-order controller. The low-order router includes a mobile terminal side communication section 102, a first control section 104, a communication terminal side communication section 100, and a controller side communication section (not shown) which executes data communication with the low-order controller. The low-order controller includes a communication section (not shown) which executes data communication with the low-order router, a second control section 103 and a generation section 101.

The first control sections 20g, 104 transmit data concerning processing carried out by the controllers (high-order controller, and low-order controller) to the controllers through the controller side communication sections. The first controllers 20g, 104 acquire data sent from the second control sections 20f, 103 through the controller side communication sections.

According to the embodiment, after the determination section 20b determines reception timing at each base station (e.g., base station 42, 43 or 44), a determination processing by the determination section 20b is carried out. Regarding description of this determination processing, the following replacement is made in the description of the determination processing by the determination section 20b of the embodiment. That is, the "MP high-order switching device 20" is replaced by the "high-order controller included in the MP high-order switching device 20," the "MP low-order switching device 31" is replaced by the "low-order controller included in the MP low-order switching device 31," the "low-order switching device 32 which executes no multicast transmission" is replaced by the "router included in the low-order switching device 32," and the "communication terminal side communication sections 20a, 100" and the "mobile terminal side communication sections 20d, 102" are replaced by the "communication sections of the controllers (high-order controller, low-order controller)."

The second control sections 20f, 103 instruct the communication sections of the controllers (high-order controller, low-order controller) so that packet data can be transmitted and received at transmission/reception timing determined by the determination section 20b.

Moreover, the following replacement need be made in the description of the embodiment. The "identification information of the low-order switching devices 31, 32" is replaced by "identification information of the low-order router and identification information of the low-order controller," the "identification information of the MP low-order switching device 31" is replaced by "identification information of the low-order controller of the MP low-order switching device 31," and the "mobile terminal side communication section and the communication terminal side communication section controlled by the second control section" are replaced by the "communication sections of the controllers (high-order controller, low-order controller)."

Data processing time managed by the second control sections 20f, 103 is a time period necessary from the reception of data by the communication sections of the controllers (high-order controller, low-order controller) to the transmission of the data from the communication sections of the controllers.

Additionally, the following replacement need be made in the description of the modified examples 1 and 2. The "mobile terminal side communication section of the MP low-order switching device 31" need be replaced by the "communication section of the low-order controller of the MP low-order switching device 31." The "mobile terminal side communication section of the MP high-order switching device 20" need be replaced by the "communication section of the high-order controller of the MP high-order switching device 20." The "identification information of the MP low-order switching device 31" need be replaced by the "identification information of the low-order controller of the MP low-order switching device 31."

Furthermore, the following replacement need be made in the description of the modified examples 3 and 4. The "MP high-order switching device 20" is replaced by the "high-order controller included in the MP high-order switching device 20," the "MP low-order switching device 31" is replaced by the "controller included in the MP low-order switching device 31," the "identification information of the MP high-order switching device 20 (and of the MP low-order switching device 31)" is replaced by the "identification information of the high-order controller (and of the low-order controller) of the MP high-order switching device 20 (and of the MP low-order switching device 31)," the "mobile terminal side communication section and the communication terminal side communication section controlled by the second control section" are replaced by the "communication sections of the controllers (high-order controller, low-order controller)."

MODIFIED EXAMPLE 6

In the embodiment and the modified examples, the description has been given of the case where one low-order switching device is included in the communication paths between the high-order switching device 20 and the base stations 41, 42, .... However, the present invention is not limited to this case. For example, a plurality of low-order switching devices may be included in the communication paths between the high-order switching device 20 and the base stations 41, 42, In such a case, the foregoing embodiment and modified examples can be applied. However, the determination section 20b must be disposed in a switching device (switching device which can serve as an MP high-order switching device) other than the low-order switching devices connected to the base stations.

Figure 19:
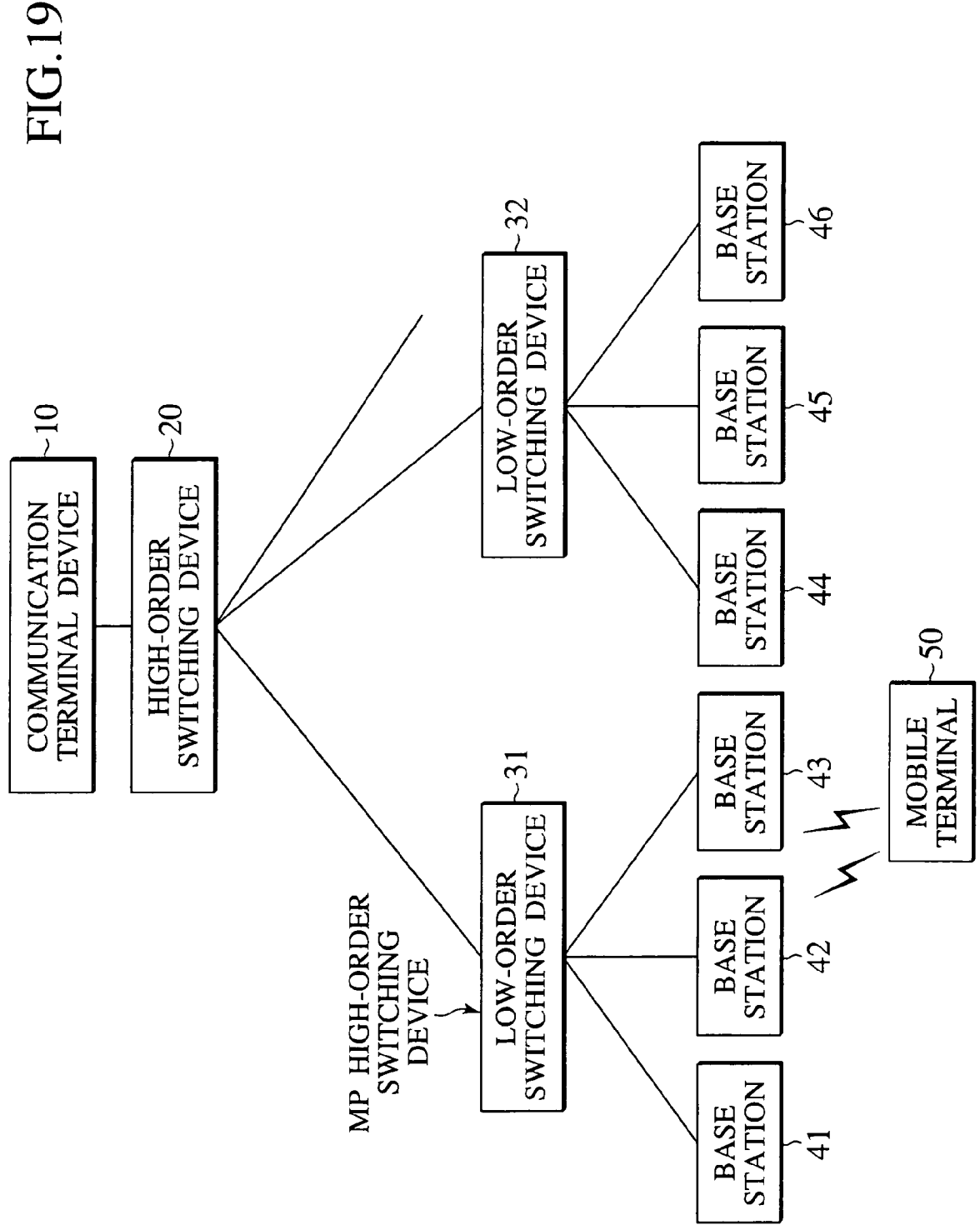
FIG. 19 is a view showing a configuration of a communication system of Modified Example 6.

The present invention is not limited to the case where there are a plurality of switching devices which execute multicast transmission. The present invention can be applied to a case where there is one switching device which executes multicast transmission. For example, in a case as shown in FIG. 19, the mobile terminal 50 executes radio communication with the plurality of base stations 42, 43 connected to one low-order switching device 31. In this event, it is only the low-order switching device 31 that executes multicast communication. In such a case, the one low-order switching device 31 needs to function as an MP high-order switching device. Thus, data communication is enabled between the mobile terminal 50 and the communication terminal device 10.

According to the foregoing embodiment and modified examples, all the switching devices (low-order switching devices 31, 32, and high-order switching device 20) have functions to execute multicast communication. However, the present invention is not limited to this case. For example, of all the switching devices, only a predetermined number of switching devices may have functions to execute multicast communication so that the effects of the present invention can be achieved to a certain extent. Accordingly, costs for realizing the communication system of the present invention can be reduced.

According to the foregoing embodiment and modified examples, the determination section 20b is provided in the high-order switching device 20. However, the determination section 20b may be disposed in, e.g., the low-order switching device 31, 32. The determination sections 20b may be included in all the switching devices. It may be possible to allow the determination section 20b to operate in a switching device, of all the switching devices, which serves as an MP high-order switching device.

Furthermore, the determination section 20b may be provided in a device which is configured to be independent of the switching device. In this case, information indicating each transmission/reception timing determined by the determination section 20b need be transmitted to the MP high-order switching device 20, the MP low-order switching device 31, each base station, and the mobile terminal 50.

Various modifications will become possible for those skilled in the art after receiving the teachings of the present disclosure without departing from the scope thereof.

What is claimed is:

1. A communication system comprising:
   a communication terminal device configured to communicate with a mobile terminal;
   a plurality of low order switching devices included in communication paths between the communication terminal device and the mobile terminal, said plurality of low order switching devices each configured to transmit packet data to a plurality of base stations and a plurality of secondary low order switching devices in a multicast manner;

a high order switching device configured to transmit packet data to the plurality of low order switching devices in a multicast manner;

wherein the high order switching device includes a first determiner configured to determine a transmission time for the high order switching device and each of the plurality of low order switching devices to transmit the packet data resulting in simultaneous data reception at the mobile terminal, wherein the determination is based on a time period necessary for transmission of the packet data from the high order switching device to each of the plurality of low order switching devices, and a transmission time from each of the plurality of low order switching devices to the plurality of base stations;

the high order switching device includes a first transmitter configured to transmit the packet data from the high order switching device to the plurality of low order switching devices, and each of the plurality of low order switching devices includes a first transmitter configured to transmit the packet data from each of the plurality of low order switching devices to the plurality of base stations based on the transmission timing determined by the first determiner;

the high order switching device includes a first generator configured to generate a plurality of radio slot data, based on transmission target packet data, wherein said transmission target packet data includes packet data transmitted to the high order switching device, and based on the number of low order switching devices that are destinations of multicast transmission by the high order switching device, the high order switching device further including a second generator configured to generate packet data including radio slot data generated by the first generator;

each of the plurality of low order switching devices include a generator configured to generate packet data, based on packet data received from the high order switching device, which includes radio slot data generated by the first generator of the high order switching device; and the high order switching device and each of the plurality of low order switching devices include a second transmitter configured to transmit the packet data including the radio slot data to the plurality of low order switching devices based on transmission timing determined by the first determiner.

2. A communication system, comprising:

a communication terminal device configured to communicate with a mobile terminal, a plurality of low order switching devices included in communication paths between the communication terminal device and the mobile terminal, said plurality of low order switching devices each configured to transmit packet data to a plurality of base stations and a plurality of secondary low order switching devices in a multicast manner;

a high order switching device configured to transmit packet data to the plurality of low order switching devices in a multicast manner;

wherein the high order switching device includes a first determiner configured to determine a transmission time for the high order switching device and each of the plurality of low order switching devices to transmit the packet data resulting in simultaneous data reception at the mobile terminal, wherein the determination is based on a time period necessary for transmission of the packet data from the high order switching device to each of the plurality of low order switching devices, and a transmission time from each of the plurality of low order switching devices to the plurality of base stations;

the high order switching device includes a first transmitter configured to transmit the packet data from the high order switching device to the plurality of low order switching devices, and each of the plurality of low order switching devices include a first transmitter configured to transmit the packet data from each of the plurality of low order switching devices to the plurality of base stations based on the transmission timing determined by the first determiner;

the high order switching device includes a second determiner configured to determine a reception timing, wherein each of the plurality of base stations, and each of the plurality of low order switching devices receives the packet data simultaneously;

each of the plurality of low order switching devices and the base station include a difference information generator configured to generate information including a difference between a time at which each of the plurality of base stations received the packet data, and a time at which each of the plurality of low order switching devices received the packet data, and the reception timing determined by the second determiner; and the high order switching device includes a second transmitter configured to transmit the packet data from the high order switching device to a predetermined low order switching device, and the predetermined low order switching device includes a second transmitter configured to transmit the packet data from the predetermined low order switching device to a predetermined base station based on the difference information and the second determiner at a predetermined transmission timing.

3. A communication system according to claim 2, further comprising:

a third transmitter, at the predetermined low order switching device, configured to transmit transmission impossibility information from the predetermined low order switching device to the high order switching device if the second transmitter cannot transmit the packet data to the predetermined base station at the predetermined transmission timing; and a fourth transmitter, at the high order switching device, configured to transmit the packet data from the high order switching device to the predetermined low order switching device at the predetermined transmission timing, based on the transmission impossibility information.

4. A high order switching device configured to transmit packet data in a multicast manner when a communication terminal device transmits data to a mobile terminal through a plurality of base stations, comprising:

a first determiner configured to determine a transmission time for the high order switching device and each of the plurality of low order switching devices to transmit packet data resulting in simultaneous data reception at the mobile terminal, wherein the determination is based on a time period necessary for transmission of the packet data from the high order switching device to each of the plurality of low order switching devices, and a time period necessary for transmission of the packet data from each of the plurality of low order switching devices to the plurality of base stations a first generator configured to generate a plurality of radio slot data, based on transmission target packet data, wherein said transmission target packet data includes packet data transmitted to the high order switching device from the communication terminal device, and based on a number of low order switching devices that are destinations of multicast transmission by the high order switching device;

a first transmitter, configured to transmit each of the transmission timings determined by the first determiner to the one or more low order switching devices; and a second transmitter, configured to transmit the packet data to the one or more base stations and to the one or more low order switching devices, based on the transmission timing that is determined by the first determiner.

5. A high order switching device configured to transmit packet data in a multicast manner when a communication terminal device transmits data to a mobile terminal through a plurality of base stations, and which is a switching device closest to the communication terminal device included in communication paths between the mobile terminal and the communication terminal device, comprising:

a first determiner configured to determine a transmission time for a high order switching device and each of the plurality of low order switching devices to transmit packet data resulting in simultaneous data reception at the mobile terminal wherein the determination is based on a time period necessary for transmission of packet data from the high order switching device to each of the plurality of low order switching devices, and a transmission time from each of the plurality of low order switching devices to the plurality of base stations;

a first transmitter configured to transmit each of the transmission timings determined by the first determiner to the low order switching device corresponding to the transmission timing;

a first generator configured to generate a plurality of radio slot data, based on transmission target packet data that is packet data transmitted from the communication terminal device, and based on the number of devices that are destinations of multicast transmission of the packet data;

a second generator configured to generate packet data containing radio slot data generated by the first generator; and a second transmitter configured to transmit the packet data generated by the second generator to each of the plurality of low order switching devices and base stations that are destinations of multicast transmission, based on the transmission timing determined by the first determiner.

6. A high order switching device according to claim 5, further comprising:

a second determiner configured to determine a reception timing at which each of the plurality of base stations and each of the plurality of low order switching devices receives the packet data, so that data reception timings at the mobile terminal become simultaneous among the plurality of base stations;

an acquisition unit configured to acquire transmission impossibility information indicating that a predetermined low order switching device cannot transmit packet data to a predetermined device at predetermined transmission timing for the predetermined device to receive the packet data at the reception timing which is determined by the second determiner, when there is a difference between at least one timing, among timing at which each of the plurality of base stations received the packet data and timing at which each of the plurality of low order switching devices received the packet data, and the reception timing determined by the second determiner, corresponding to the one timing, and when the predetermined low order switching device acquires difference information from the predetermined device after the difference information indicating the difference is generated; and a third transmitter which, based on the transmission impossibility information, transmits packet data to the predetermined low order switching device at transmission timing for the predetermined low order switching device to transmit the packet data to the predetermined device at the predetermined transmission timing.

7. A communication method wherein a communication terminal device transmits data to a mobile terminal through a plurality of base stations, comprising:

transmitting, via a high order switching device, packet data in a multicast manner to a plurality of low order switching devices included in communication paths between the communication terminal device and the plurality of base stations;

transmitting the packet data in a multicast manner from the plurality of low order switching devices to the plurality of base stations;

determining a transmission time for the high order switching device and each of the plurality of low order switching devices to transmit packet data resulting in simultaneous data reception at the mobile terminal, wherein the determination is based on a time period necessary for transmission of the packet data from the high order switching device to each of the plurality of low order switching devices, and a time period necessary for transmission of the packet data from each of the plurality of low order switching devices to the plurality of base stations;

transmitting packet data resulting in simultaneous data reception at the mobile terminal, based on the transmission timing determined by the determining; and generating a plurality of radio slot data, based on transmission target packet data.

8. The communication system according to claim 1, each of the plurality of low order switching devices further comprising a third generator configured to generate packet data containing radio slot data based on the packet data transmitted to a respective low order switching device and then a number of devices that are destinations of multicast transmission by the respective low order switching device.

9. The communication system according to claim 8, each of the plurality of low order switching devices further comprising a third transmitter configured to transmit the packet data generated by the third generator to a plurality of base stations connected to each of the plurality of low order switching devices, based on transmission timing determined by the first determiner.

10. The communication system according to claim 9, wherein, each of the plurality of base stations transmits radio slot data contained in the packet data to the mobile terminal, and the mobile terminal generates the transmission target packet data, based on the radio slot data transmitted from each of the plurality of base stations.

* * * * *